United States Patent
Parthasarathy et al.

(10) Patent No.: US 6,917,987 B2
(45) Date of Patent: Jul. 12, 2005

(54) METHODOLOGY AND MECHANISM FOR REMOTE KEY VALIDATION FOR NGIO/ INFINIBAND™ APPLICATIONS

(75) Inventors: Balaji Parthasarathy, Hillsboro, OR (US); Dominic J Gasbarro, Forest Grove, OR (US); Brian M. Leitner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 09/816,344

(22) Filed: Mar. 26, 2001

(65) Prior Publication Data

US 2002/0184392 A1 Dec. 5, 2002

(51) Int. Cl.$^7$ .............................................. G06F 13/00
(52) U.S. Cl. ...................................................... 709/249
(58) Field of Search ............................... 709/200, 249; 711/137

(56) References Cited

U.S. PATENT DOCUMENTS

| | | |
|---|---|---|
| 6,578,122 B2 * | 6/2003 | Beukema et al. ........... 711/163 |
| 6,625,768 B1 | 9/2003 | Reohr, Jr. et al. |
| 6,775,719 B1 | 8/2004 | Leitner et al. |
| 2002/0071450 A1 | 6/2002 | Gasbarro et al. |
| 2002/0124148 A1 | 9/2002 | Beukema et al. |
| 2002/0141424 A1 | 10/2002 | Gasbarro et al. |
| 2002/0191599 A1 | 12/2002 | Parthasarathy et al. |
| 2004/0151176 A1 | 8/2004 | Burton et al. |
| 2004/0151177 A1 | 8/2004 | Burton et al. |

FOREIGN PATENT DOCUMENTS

WO PCT/US02/05858 2/2002

OTHER PUBLICATIONS

Pending U.S. Appl. No. 09/671,707, entitled "Host–Fabric Adapter and Method of Connecting a Host System to a Channel–Based Switched Fabric in a Data Network", filed Sep. 28, 2000, P8327.

Pending U.S. Appl. No. 09/603,957, entitled "Device to Receive, Buffer, and Transmit Packets of Data in a Packet Switching Network", filed Jun. 26, 2000, P8329.

(Continued)

*Primary Examiner*—Robert B. Harrell
(74) *Attorney, Agent, or Firm*—Rob D. Anderson

(57) ABSTRACT

A host system is provided with one or more host-fabric adapters installed therein for connecting to a switched fabric of a data network. The host-fabric adapter may comprise at least one Micro-Engine (ME) arranged to establish connections and support data transfer operations via a switched fabric; a serial interface arranged to receive and transmit data packets from the switched fabric for data transfer operations; a host interface arranged to receive and transmit host data transfer work requests from the host system for data transfer operations; a context memory arranged to provide context information necessary for data transfer operations; a doorbell manager arranged to update the context information needed for the Micro-Engine (ME) to process host data transfer requests for data transfer operations; and, a remote key manager arranged to manage remote keys and check the validity of the remote keys which correspond to outstanding data transfer operations.

36 Claims, 19 Drawing Sheets

OTHER PUBLICATIONS

Pending U.S. Appl. No. 10/842,752, entitled "Device to Receive, Buffer, and Transmit Packets of Data in a Packet Switching Network", filed May 10, 2004, P8329C.

Pending U.S. Appl. No. 09/608,645, entitled "Memory Utilization in a Network Interface", filed Jun. 30, 2002, P8330.

Pending U.S. Appl. No. 09/669,670, entitled "Host–Fabric Adapter and Method of Connecting a Host System to a Channel–Based Switched Fabric in a Data Network", filed Sep. 26, 2000, P9436.

Pending U.S. Appl. No. 09/672,711, entitled "Host–Fabric Adapter Having Hardware Assist Architecture and Method of Connecting a Host System to a Channel–Based Switched Fabric in a Data Network", filed Sep. 29, 2000, P9438.

Pending U.S. Appl. No. 09/698,188, entitled "Host–Fabric Adapter Having Hardware Assist Architecture and Method of Connecting a Host System to a Channel–Based Switched Fabric in a Data Network", filed Oct. 30, 2000, P9439.

Pending U.S. Appl. No. 09/698,166, entitled "Host–Fabric Adapter Having Memory Access Bandwidth Optimizing Smart Decoder", filed Oct. 30, 2000, P9440.

InfiniBand™ Architecture Release 1.0, InfiniBand$^{SM}$ Trade Association, vol. 1, General Specifications, Oct. 24, 2000.

* cited by examiner

EXAMPLE SOFTWARE DRIVER STACKS OF HOST SYSTEM

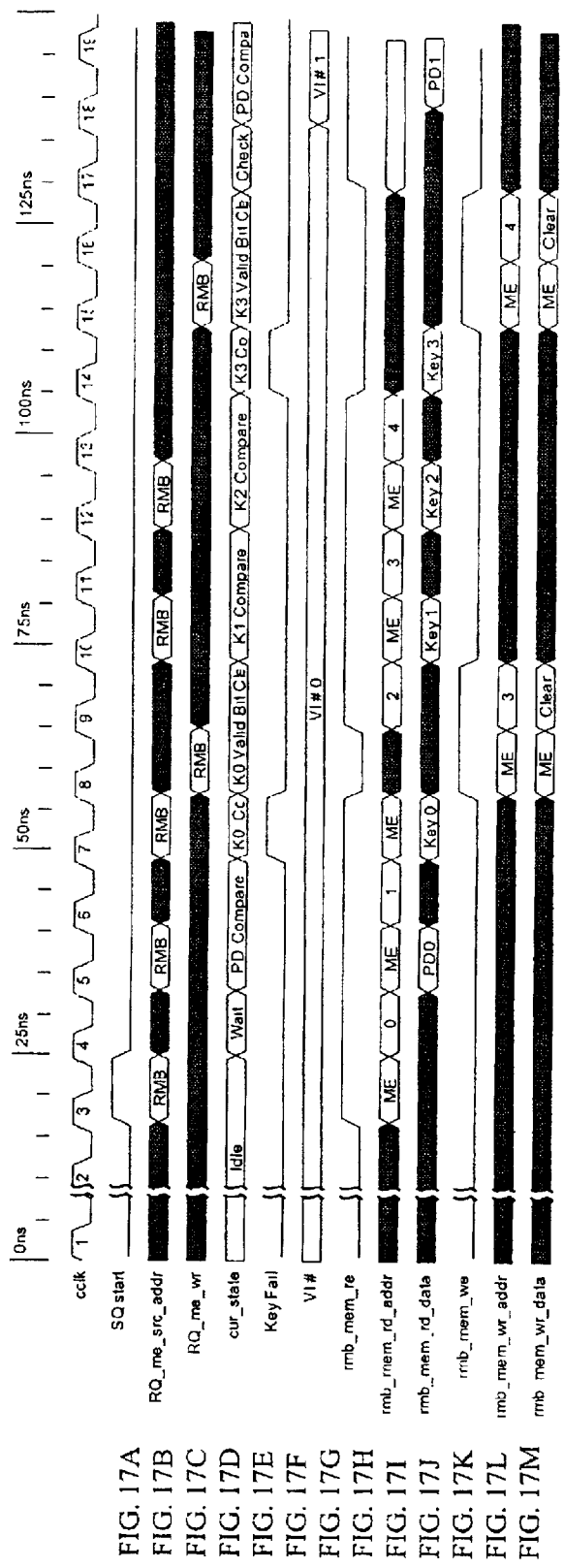

METHODOLOGY AND MECHANISM FOR REMOTE KEY VALIDATION FOR NGIO/INFINIBAND™ APPLICATIONS

TECHNICAL FIELD

The present invention relates to a data network, and more particularly, relates to a host-fabric adapter having a mechanism for managing and validating remote keys which correspond to outstanding data transactions (e.g., read/write operations) in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via a data network. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation and other companies to provide a standards-based I/O platform that uses a switched fabric and separate I/O channels instead of a shared memory-mapped bus architecture for reliable data transfers between end-nodes in a data network, as set forth in the "*Next Generation Input/Output (NGIO) Specification*," NGIO Forum on Jul. 20, 1999 and the "*InfiniBand™ Architecture Specification*," the InfiniBand™ Trade Association on Oct. 24, 2000. Using NGIO/InfiniBand™, a host system may communicate with one or more remote systems using a Virtual Interface (VI) architecture in compliance with the "*Virtual Interface (VI) Architecture Specification, Version 1.0*," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain VIs, also known as work queues (WQ) formed in pairs including inbound and outbound queues in which work requests (WRs) are posted to describe data movement operation and location of data to be moved for processing and/or transportation via a data network. Each host system may serve as a source (initiator) system which initiates a message data transfer (message send operation) or a target system of a message passing operation (message receive operation). Work requests submitted from a consumer that cause work instructions, called Work Queue Elements ("WQEs"), to be posted on work queues associated with a given network interface card for data transfer operations such as send/receive operations and remote direct memory access "RDMA" read/write operations. One or more channels between communication devices at host systems via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card for a host system to connect to a data network using a channel-based, switched fabric architecture to support data movement operations between communication devices at a host system or between host systems or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter installed at a host system in a data network using a channel-based, switched fabric architecture for NGIO/InfiniBand™ applications. Also needed is a methodology or mechanism for managing and validating remote keys which correspond to outstanding data transactions (e.g., read/write operations) in such a data network, via a channel-based switched fabric.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIGS. 17A, 17B, 17C, 17D, 17E, 17F, 17G, 17H, 17I, 17J, 17K, 17L, and 17M illustrate an example timing diagram of a Remote Key Manager Block (RMB) operation where there are multiple key mismatches with intermittent RQ memory accesses according to an embodiment of the present invention.

In all the figures descriptions, the term "VI" as set forth in Virtual Interface (VI) architecture specification may also be known as work queue pair (WQP) as set forth in the "*Next Generation Input/Output (NGIO) Specification*" or simply as queue pair (QP) as set forth in the "*InfiniBand™ Architecture Specification.*" Therefore, "VI", "WQP" and "QP" are interchangeably used and they mean one and the same.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
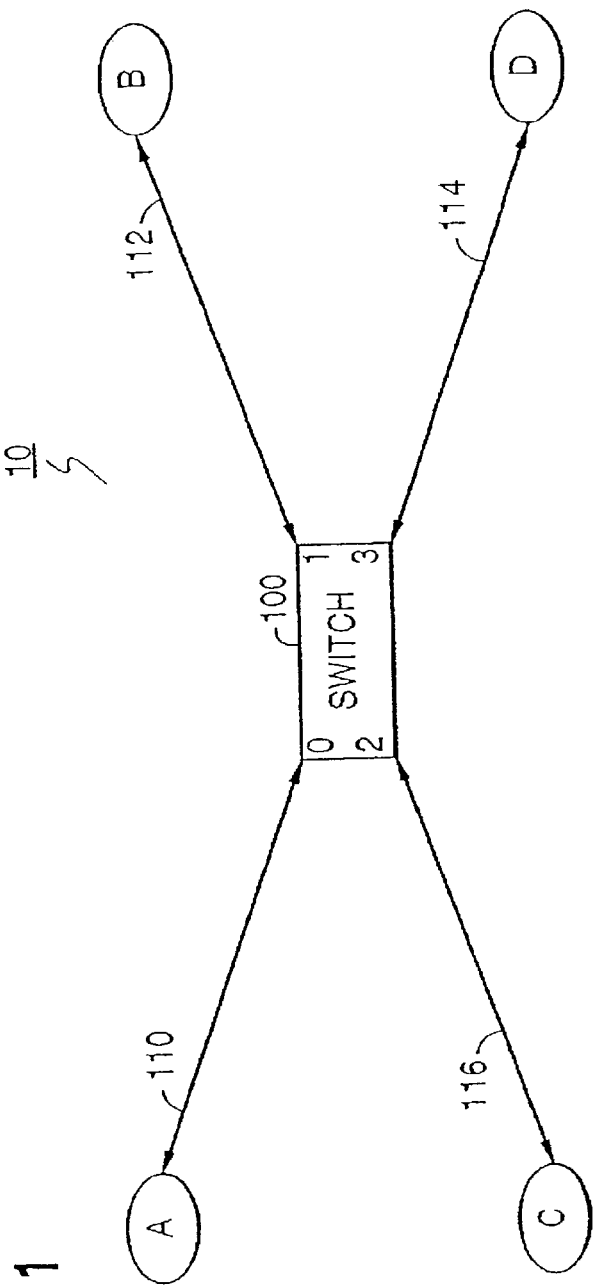
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand*™ *Specification* for enabling the endpoints (nodes) to communicate to each other over an NGIO/InfiniBand™ channel(s) with minimum data transfer rates of up to 2.5 gigabit per second (Gbps), for example.

Figure 2:
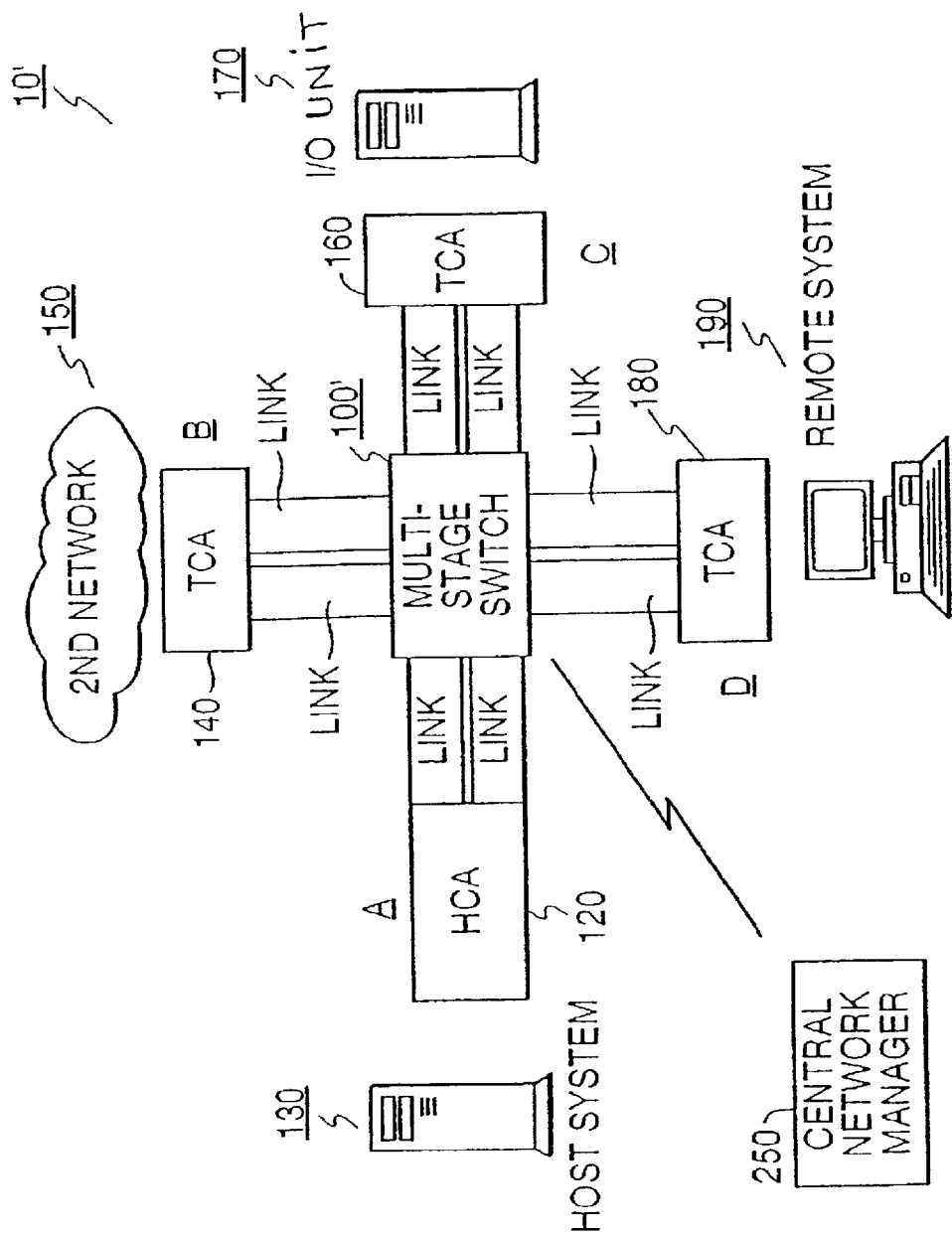
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of packets between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3A:
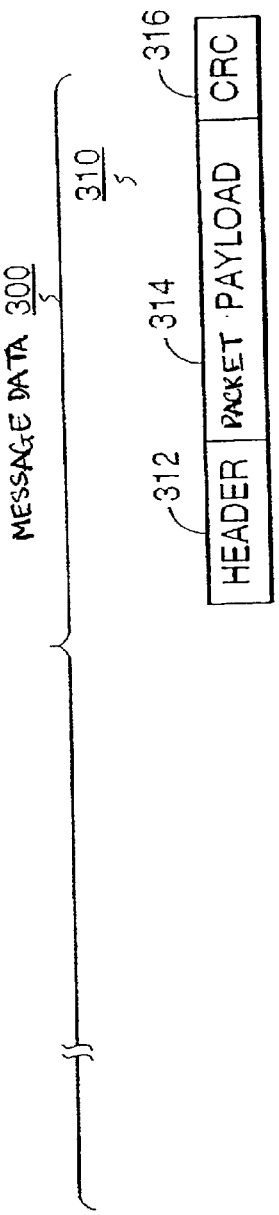
FIGS. 3A, 3B, 3C, and 3D illustrate packet formats of message data transmitted from a source node to a destination node and work requests in a form of "Work Queue Elements" (WQE) posted for data transfer operations in an example data network according to an embodiment of the present invention.
Figure 3B:
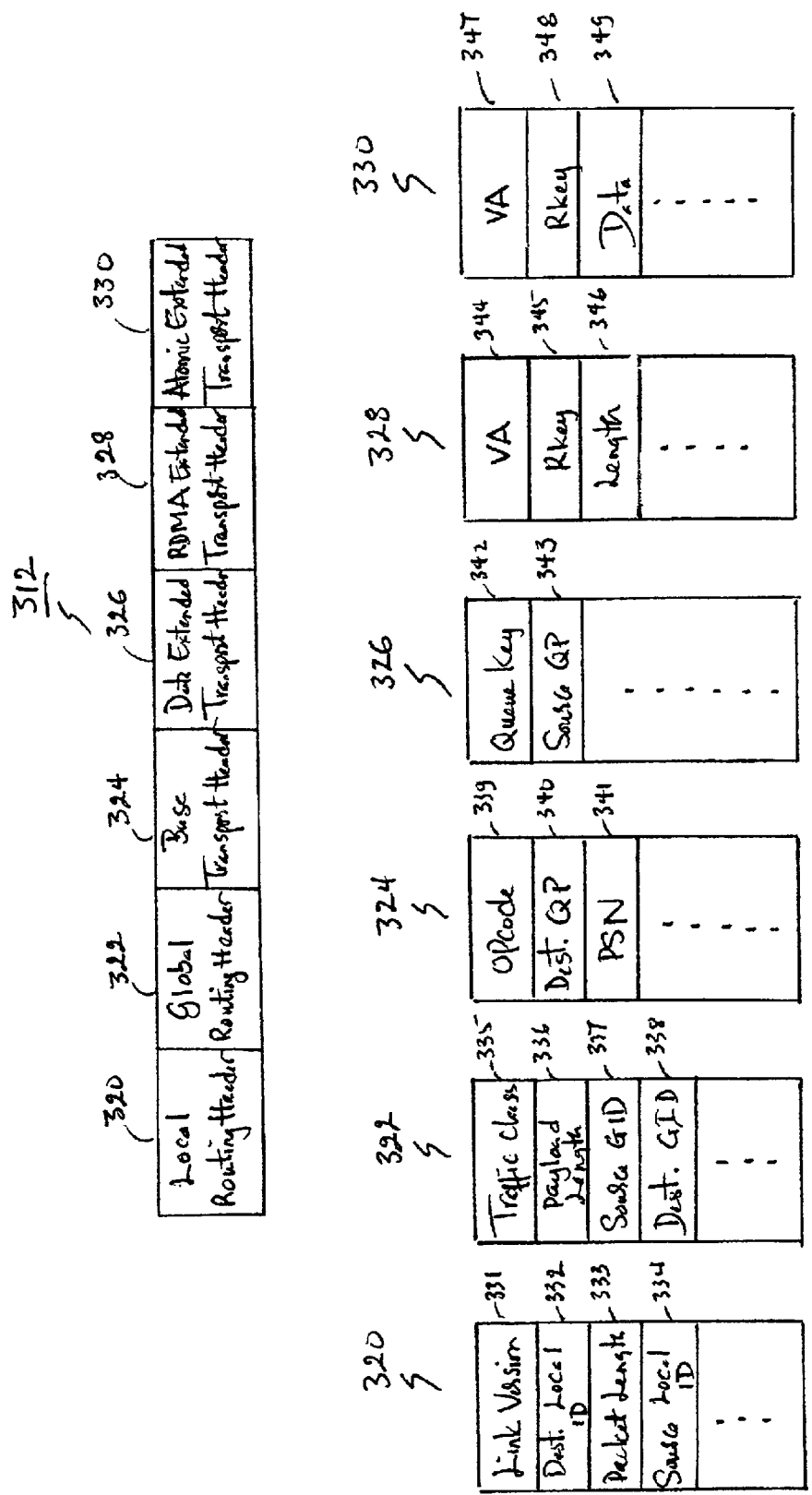

FIGS. 3A–3B illustrate an embodiment of packet formats of message data transmitted from a source node (data transmitter) to a destination node (data receiver) through switches and/or intermediate nodes according to the "*InfiniBand™ Architecture Specification*" as set forth by the InfiniBand™ Trade Association on Oct. 24, 2000. As shown in FIG. 3A, a message data 300 may represent a sequence of one or more data packets 310 (typically derived from data transfer size defined by a work request). Each packet 310 may include a header information 312, a variable format packet payload 314 and a cyclic redundancy check (CRC) information 316. Under the "*Next Generation Input/Output (NGIO) Specification*" as previously set forth by the NGIO Forum on Jul. 20, 1999, the same data packets may be referred to as cell packets having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, as shown in FIG. 3B, different types of headers, including: for example, a local routing header 320, a global routing header 322, a base transport header 324 and extended transport headers such as data extended transport header 326, a RDMA extended transport header 328, and an Atomic extended transport header 330.

The local routing header 320 contains fields used for local routing by switches within the example data network 10' shown in FIG. 2. For example, the local routing header 320 may include, but not limited to, a link version field 331 used to identify the InfiniBand™ link level protocols, a destination local ID field 332 used to identify the destination port and data path in the data network 10'; a packet length field 333 used to identify the size of the data packet; and a source local ID 334 used to identify the source port (injection point).

The global routing header 322 contains fields used for routing data packets between nodes of the example data network 10' shown in FIG. 2. For example, the global routing header 322 may include, but not limited to, a traffic class field 335 used for communication with global service level; a payload length field 336 used to indicate the length of the packet in bytes; a source GID field 333 used to identify the global identifier (GID) for the port which injected the packet into the data network 10'; and a destination GID field 338 used to identify the GID for the port which will consume the packet from the data network 10'.

The base transport header 324 contains fields used for data message transports within the data network 10' shown in FIG. 2. For example, the base transport header 324 may include, but not limited to, an OpCode field 339 used to indicate the packet type, identify if the packet is the first, last, immediate or only packet of a data message and specifies the operation (Send, RDMA Write, RDMA Read, Atomic); a destination QP field 340 used to indicate the Work Queue Pair (WQP) number at the destination; a packet sequence number (PSN) field 341 used to detect a missing or duplicate packet.

The data extended transport header 326 contains additional transport fields for datagram service. For example, the data extended transport header 326 may include, but not limited to, a Queue Key (Q_Key) field 342 used to authorize access to the receive queue; and a source QP field 343 used to indicate the WQP number at the source.

The RDMA extended transport header 328 contains additional transport fields for RDMA operations. For example, the RDMA extended transport header 328 may include, but not limited to, a Virtual Address (VA) field 344 used to provide the Virtual Address of the RDMA operation; a Remote Key (Rkey) field 345 used to authorize access for the RDMA operation; and a length field 346 used to indicate the length (in bytes) for the direct memory access operation.

The Atomic extended transport header 330 contains additional transport fields for atomic packets and atomic operations. For example, the Atomic extended transport header 330 may include, but not limited to, a Virtual Address (VA) field 347 used to provide the remote Virtual Address, a Remote Key (Rkey) field 348 used to authorize access to the remote Virtual Address; and a swap and compare data field 349 used to provide operands in atomic operations.

Work Queue Elements "WQES" are posted onto appropriate work queues (WQs) from the host system 130 to describe data movement operation and location of data to be moved for processing and/or transportation, via the switched fabric 100'. Such "WQES" typically provide all the information needed to complete send queue and receive queue operations.

There may be several classes of send queue operations, including Send, Remote Memory Access (RDMA), and Memory Binding. For a Send operation, the WQE specifies a block of data in the consumer's memory space for the hardware to send to the destination, letting a receive WQE already queued at the destination specify where to place that data. For an RDMA operation, the WQE also specifies the address in the remote consumer's memory. Thus an RDMA operation does not need to involve the receive work queue of the destination.

There are three types of RDMA operations, RMDA-Write, RDMA-Read, and Atomic. The RDMA-Write operation stipulates that the hardware is to transfer data from the consumer's memory to the remote consumer's memory. The RDMA-Read operation stipulates that the hardware is to transfer data from the remote memory to the consumer's memory. The Atomic operation stipulates that the hardware is to perform a read of a remote memory location. The remote system returns the value read, and conditionally modifies/replaces the remote memory contents by writing an updated value back to the same location. In other words, the Atomic operation is a combined Read, Modify, and Write operation. An example of an Atomic operation is the Compare and Swap if Equal operation. The WQE specifies a remote memory location, a compare value, and a new value. The remote WQP reads the specified memory location, compares that value to the compare value supplied in the message, and only if those values are equal, then the WQP writes the new value to the same memory location. In either case the remote WQP returns the value it read from the memory location to the requesting WQP. The other Atomic operation is the FetchAdd operation where the remote WQP reads the specified memory location, returns that value to the requesting WQP, adds to that value a value supplied in the message, and then writes the result to that same memory location.

The Memory Bind instructs the hardware to alter memory registration relationships and change the binding of a Memory Window. The Bind Memory Window operation associates a previously allocated Memory Window to a specified address range within an existing Memory Region, along with a specified set of remote access privileges.

There may be only one receive queue operation and it is to specify a receive data buffer. A Receive WQE specifies where the hardware is to place data received from another consumer when that consumer executes a Send operation. Each time the remote consumer successfully executes a Send operation, the hardware takes the next entry from the receive queue, places the received data in the memory location specified in that receive WQE, and places a completion queue entry on the completion queue (CQ) indicating to the consumer that the receive operation has completed. Thus the execution of a Send operation causes a receive queue operation at the remote consumer.

Each Send/Receive WQE may be utilized to control the transmission or reception of a single data packet. Send "WQEs" and RDMA Write "WQEs" additionally provide a "gather" list describing the virtual addresses to fetch outgoing data from local system memory 206 (that is to describe exactly where to fetch outgoing data from local system memory 206). Receive "WQEs" and RDMA Read "WQEs" alternately provide a "scatter" list describing the virtual addresses to place incoming data in local system memory 206 (that is to describe exactly where to store incoming data within local system memory 206). Send "WQEs" are valid only on Send Work Queue chains. In contrast, receive "WQEs" are valid only on Receive Work Queue chains.

RDMA "WQEs" are a superset of Send/Receive "WQEs", and may contain additional information indicating the remote address of information transferred. Unlike Send/ Receive operations where the remote system is also using a work request to determine where to transfer message data to or from, RDMA "WQEs" specifically instruct the remote system where to transfer the message data to or from, via the use of Virtual Address (VA), Memory Handle (MH) and Remote Key sent to the remote system. Remote Key may be used for virtual to physical address translations at the remote system.

Typically, each "WQE" may begin with a control segment followed by an optional address segment and an arbitrary number of data segments. Control segments may contain control and status information. Address segments, for read/ write RDMA operations, may contain remote buffer information (i.e., memory associated with the VI targeted to receive the read/write request). Data segments, for both send/receive and read/write RDMA operations, may contain information about the local system memory 206 (i.e., memory associated with the VI issuing the send/receive or read/write request).

Figure 3C:
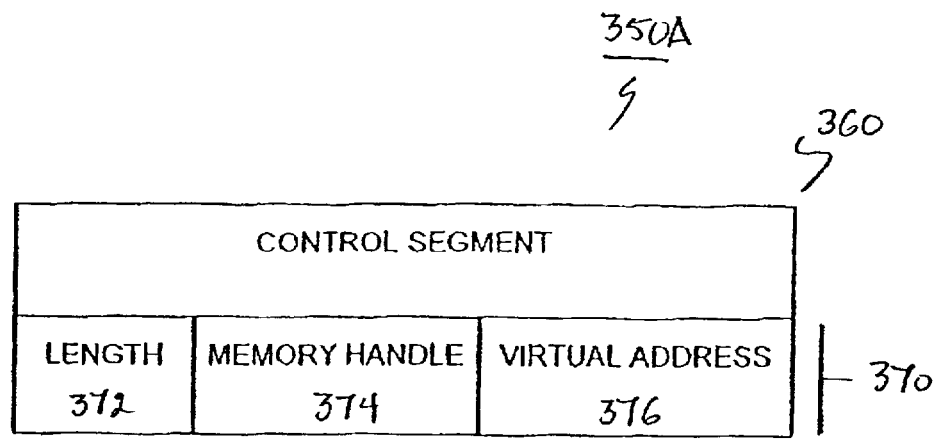
Figure 3D:
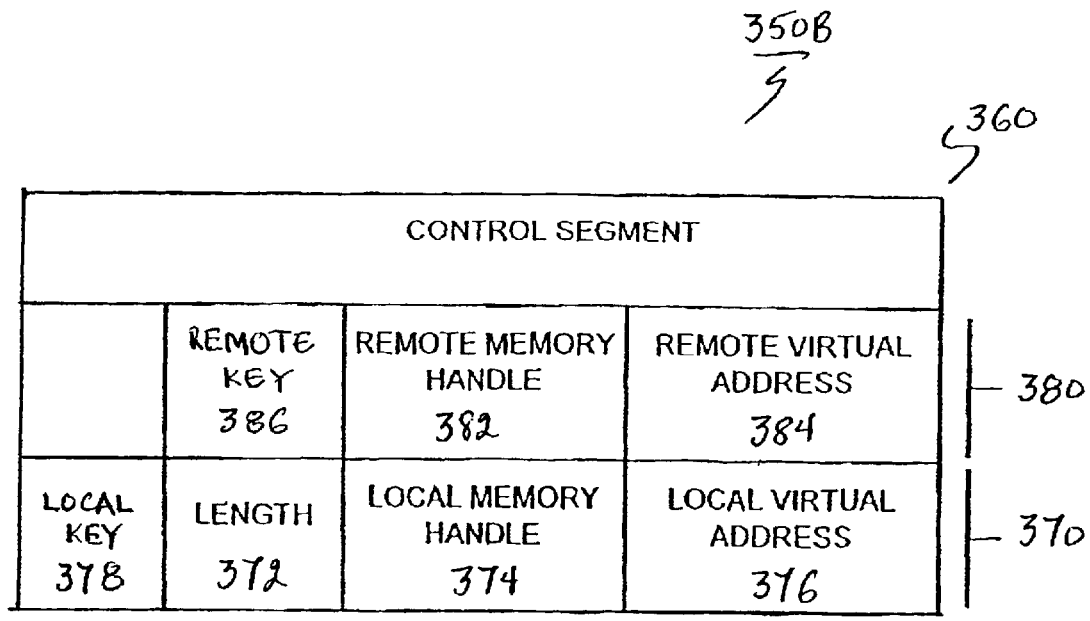

FIGS. 3C–3D illustrate an example Send/Receive type "WQE" 350A and an example Read/Write RDMA type "WQE" 350B respectively according to an embodiment of the present invention. As shown in FIG. 3C, the Send/ Receive "WQE" 350A may comprise a control segment 360 and a data segment 370 which includes a segment length field 372, a memory handle field 374, and a virtual address field 376. Segment length 372 specifies the length of the message data to be sent or that is to be received. Memory Handle (MH) 374 may be used to verify that the sending/ requesting process (i.e., VI) owns the registered memory region indicated by segment length 372 and Virtual Address (VA) 376. In addition, Local Key 378 may be included to perform a locally generated virtual address to physical address translation. For a send operation, Virtual Address (VA) 376 identifies the starting memory location of the message data to be sent in the sending VI's local memory space. For a receive operation, Virtual Address (VA) 376 identifies the starting memory location of where the received message data is to be stored in the requesting VI's local memory space.

As shown in FIG. 3D, the Read/Write RDMA "WQE" 350B may comprise a control segment 360, an address segment 380, and a data segment 370. Address segment 380 may contain a remote memory handle field 382 and a remote virtual address field 384. Data segment 370 may contain a segment length field 372, a local memory handle field 374, and a local virtual address field 376. In addition, Local Key 378 may be included to perform a locally generated virtual address to physical address translation. Remote Key ("Rkey") 386 may also be included to perform a remotely generated virtual address to physical address translation at the remote system. More specifically, remote Key 386 refers to a Memory Region or Memory Window used with a virtual address to identify the appropriate page of local system memory 206 for the remote system to access local system memory 206.

For a RDMA read operation, remote Virtual Address (VA) 384 identifies the memory location in the remote process' memory space, of the message data to be read. Local Virtual Address (VA) 376 identifies the starting memory location in the local process' memory space of where the received message is to be placed. The amount of memory to be used to store the message data may be specified by segment length field 372. For a RDMA write operation, remote Virtual Address (VA) 384 identifies the memory location in the remote process' memory space of the message data to be written. Local Virtual Address (VA) 376 identifies the starting memory location in the local process' memory space of where the message data for the packet to be transferred is read from. The size of the message data is specified by segment length field 372. Remote Memory Handle (MH) 382 corresponds to the Memory Handle (MH) associated with the memory identified by remote Virtual Address (VA) 384. Local Memory Handle 374 corresponds to the Memory Handle (MH) associated with the memory identified by local Virtual Address 376.

Figure 4A:
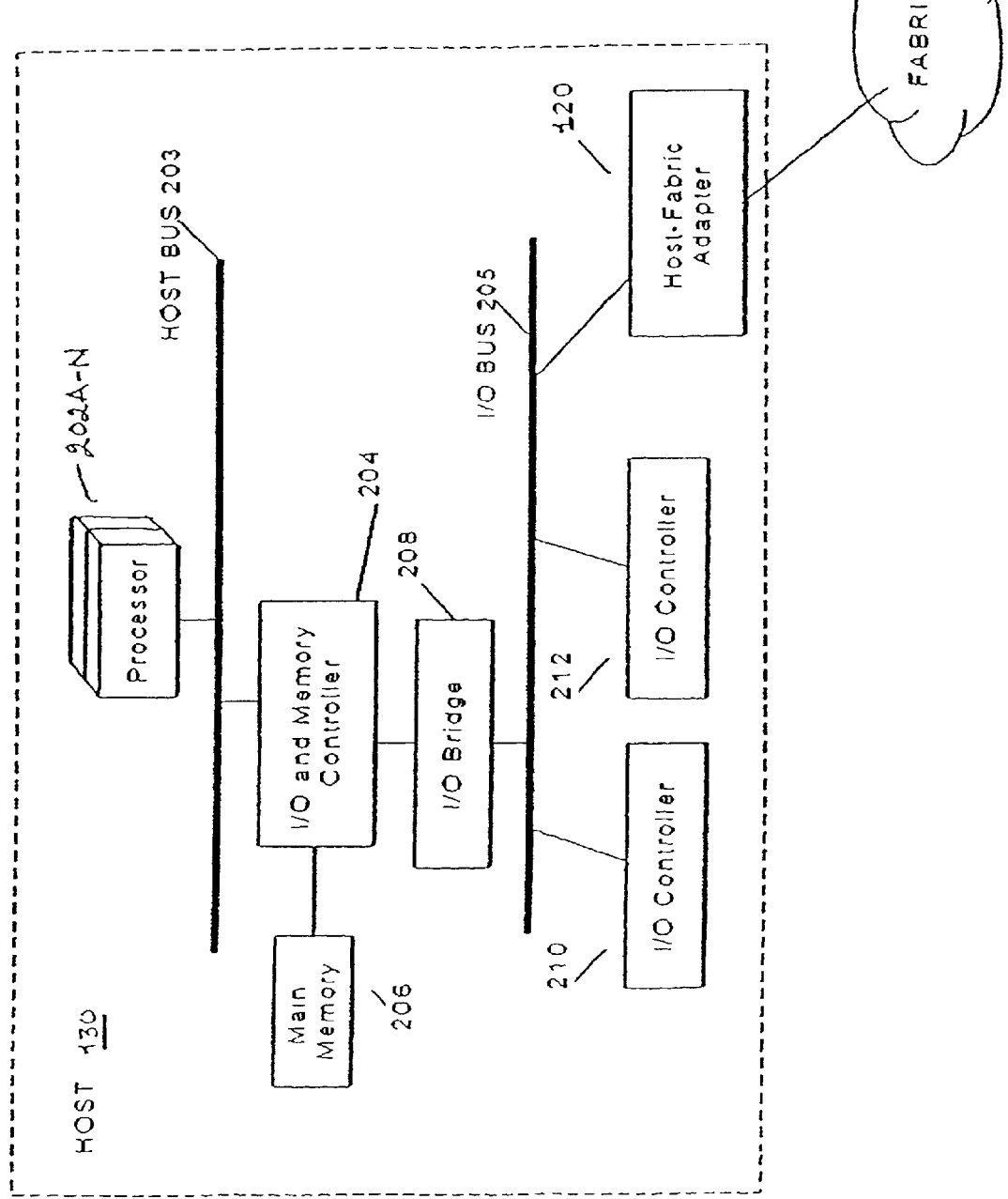
FIGS. 4A–4B illustrate a block diagram of an example host system of an example data network according to different embodiments of the present invention.

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4B:
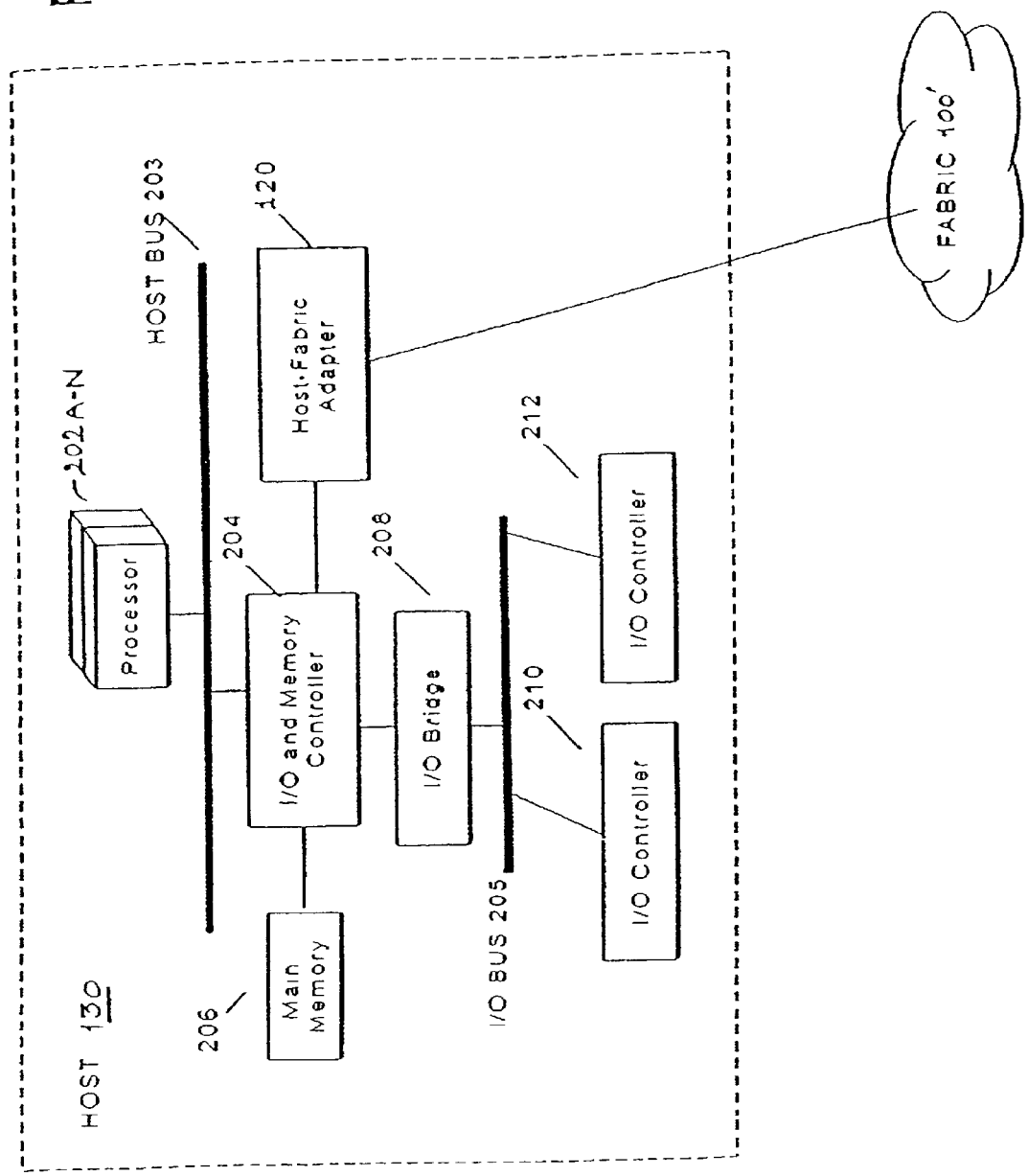

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO/InfiniBand™ switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the NGIO/InfiniBand™ switched fabric 100', while preferably being compatible with many currently available operating systems, such as Windows 2000.

Figure 5:
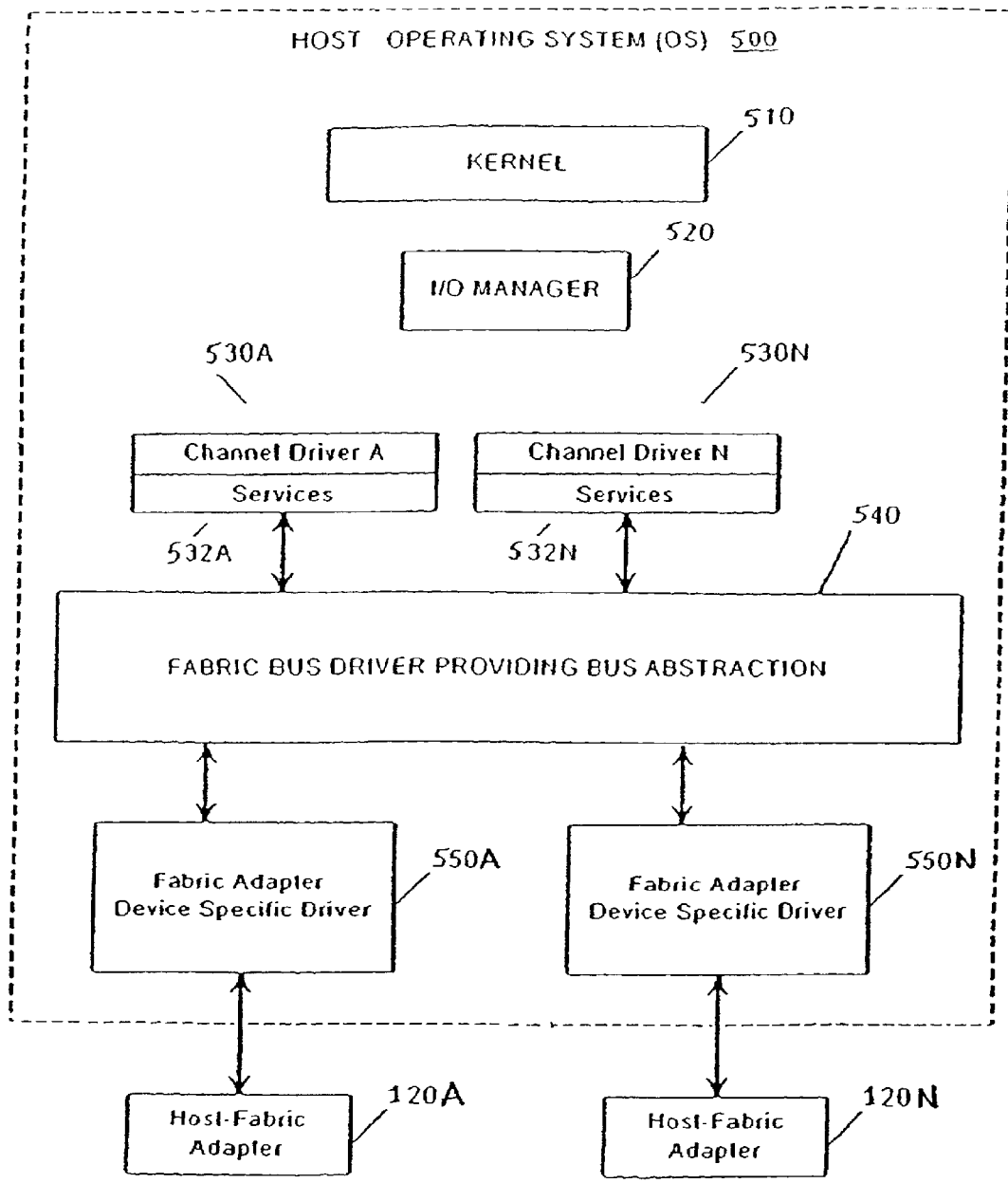
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (otherwise, known as host channel adapter "HCA") driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Connection Services Layer High Level Design*", the "*Next Generation I/O: Intel HCA Abstraction Layer High Level Design*", and the "*Next Generation I/O: Intel HCA Fabric Services Layer High Level Design*" as set forth by Intel on Aug. 6, 1999. For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the Send or Receive Queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version 1.0*," as set forth by Compaq Corp., Intel Corp., and Microsoft Corp., on Dec. 16, 1997. VI architecture comprises four basic components: Virtual Interface (VI) in which work requests are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. Under the VI architecture, the host-fabric adapter 120 and VI Kernel agent may constitute the VI provider to perform endpoint virtualization directly and subsume the tasks of multiplexing, de-multiplexing, and data transfer scheduling normally performed by the host operating system (OS) kernel 510 and device specific driver 4550A–550N as shown in FIG. 5. However, other architectures may also be used to implement the present invention. The term "VI" as set forth in the "*Virtual Interface (VI) Architecture Specification*" may also be known as work queue pair (WQP) as set forth in the "*Next Generation Input/Output (NGIO) Specification*" or simply as queue pair (QP) as set forth in the "*InfiniBand™ Architecture Specification*." Therefore, "VI", "WQP" and "QP" are interchangeable herein below.

Figure 6:
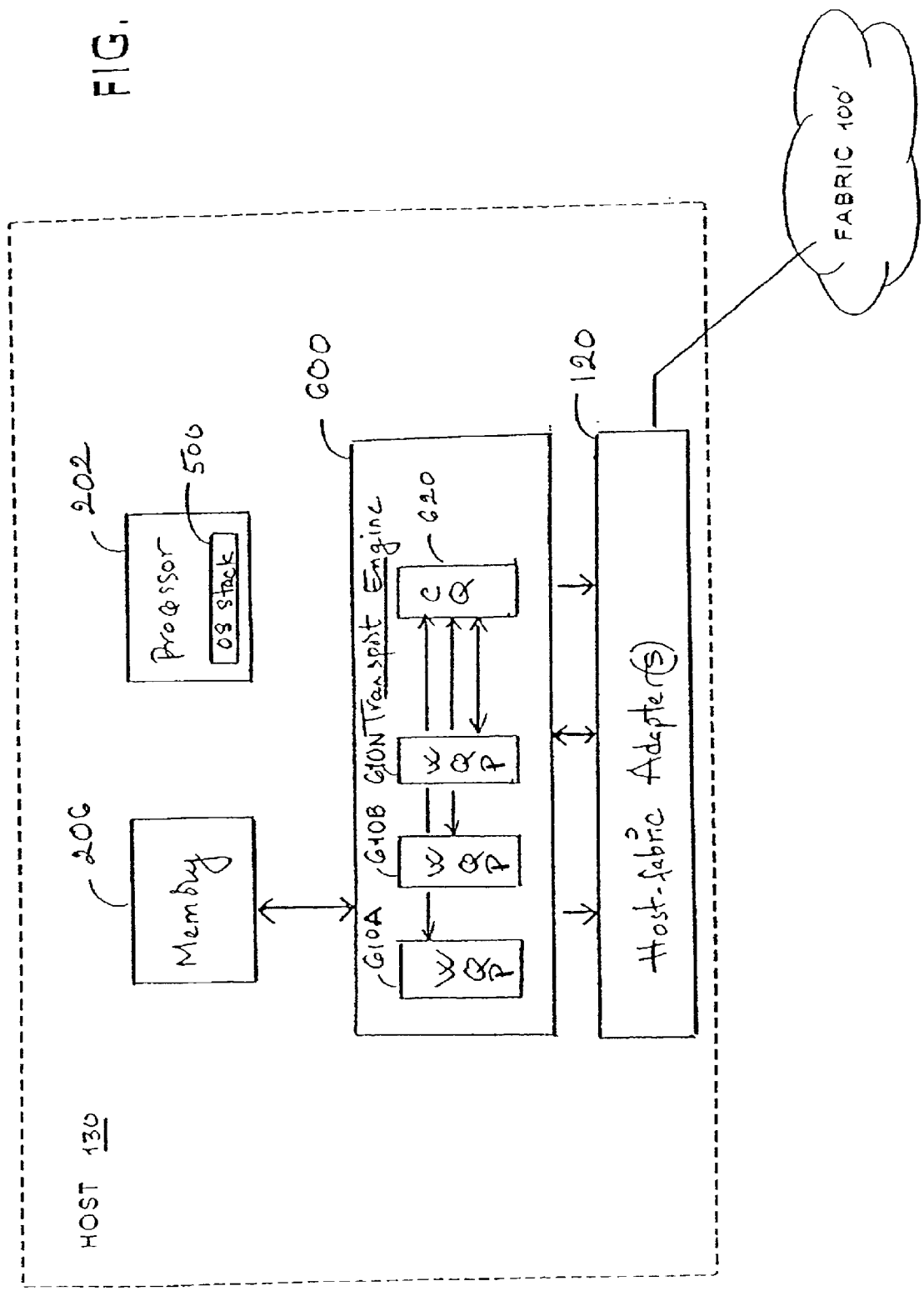
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A–4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including Receive Queue ("RQ" for inbound) and Send Queue ("SQ" for outbound), such as work queue pairs (WQP) 610A–610N in which work requests "WQEs" may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). All work queues (WQs) may share physical ports into a switched fabric 100' via one or more host-fabric adapters (HCAs) 120.

The Send Queue ("SQ" for outbound requests) of the work queue pair (WQP) may be used to as an "initiator" which requests, for example, normal message sends to remote VIs, remote direct memory access "RDMA" reads which request messages to be read from specific memory locations of a target system, via a switched fabric 100', and remote direct memory access "RDMA" writes which request messages to be written onto specific memory locations of a target system, via a switched fabric 100'.

The Receive Queue ("RQ" for inbound requests) of the work queue pair (WQP) may be used as a "responder" which receives requests for messages from normal sends, RDMA reads and RDMA writes from a target system, via a switched fabric 100'.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to work queue pairs (WQPs) 610A–610N associated with a given fabric adapter (HCA), one or more channels may be created and effectively managed so that requested operations can be performed.

Figure 7:
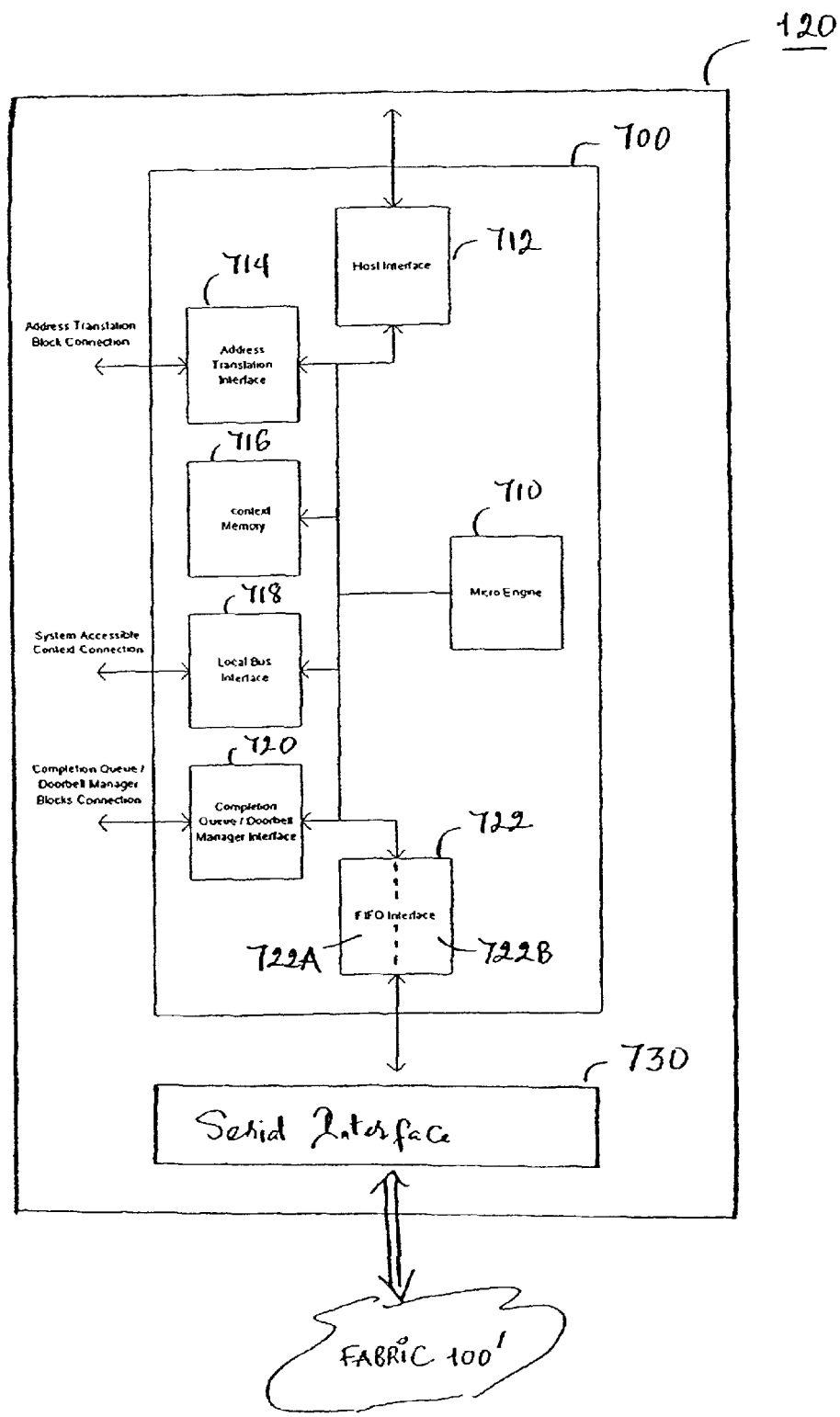
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for, but not limited thereto, NGIO/InfiniBand™ applications with minimal hardware investment, including controlling execution of NGIO/InfiniBand™ protocols with minimal pipelining and NGIO/InfiniBand™ data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100', typically via hardware SERDES (serializer/deserializer device). Both the micro-controller subsystem 700 and the serial interface 730 may be implemented as Application Specific Integrated Circuits (ASICs) of the host-fabric adapter 120.

The micro-controller subsystem 700 contains one or more independent programmable direct-memory-access (DMA) engine(s) known as Micro-Engine (ME) 710 utilized to build, send, receive and acknowledge NGIO/InfiniBand™ packets between the host memory 206 (see FIG. 6) and a serial link, and special purpose hardware interface logic blocks such as a host interface 712, an address translation interface 714, a context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue (CQ) management.

The Micro-Engine (ME) 710 may execute MicroCode to coordinate Send Queue (SQ) and Receive Queue (RQ) operations for transmitting and receiving NGIO/InfiniBand™ packets and to support completion queues (CQ) and channels in compliance with the NGIO/InfiniBand™ protocols. The Micro-Engine (ME) 710 may also control all the interface blocks through a set of micro register reads and writes. Micro registers may be available with data supplied by multiple interface blocks to help speed up ME functions. Typically the Micro-Engine (ME) 710 that controls the Send Queue (SQ) may be referred to SQ Micro-Engine (ME), and likewise, the Micro-Engine (ME) 710 that controls the Receive Queue (RQ) may be referred to RQ Micro-Engine (ME).

The host interface 712 provides an interface to either an I/O bus 205 of a host system 130 as shown in FIG. 4A, or an I/O and memory controller 204 of a host system 130 as shown in FIG. 4B for work requests, in the form of Work Queue Elements "WQEs" as shown in FIG. 3B-3C from the host system 130 for data transactions, including controlling arbitration and data/control multiplexing between different requesters, read and write transactions to the host system 130 and facilitating read completions.

The address translation interface 714 provides an interface to an address translation block (ATB) (not shown) responsible for managing the conversion of virtual address (used to address program space) to physical addresses (used to address system space) using a system memory Translation and Protection Table (TPT), and validating access to system memory for different transaction types (Write, RDMA Read and RDMA Write). In one example implementation, the host memory 206 may contain up to $2^{27}$ (128 million) 4 KByte pages wherein each system memory page can be mapped anywhere within up to 16 Tera Bytes of system memory address space. Each system memory page may also be accessed by an entry within the Translation and Protection Table (TPT) which contains information such as, for example, a 4 KByte page number corresponding to the physical address, memory protection attributes (RDMA Write Enable, RDMA Read Enable, Local Memory Write Enable) and Protection Domain (PD) whose value is matched with the value assigned to the initiator of the translation request (the Work Queue Pair requesting the translation).

The context memory interface (CMI) 716 provides an interface to a context manager (not shown) responsible for providing necessary context information for a "VI" or a work queue pair "WQP" used for sending and receiving NGIO/InfiniBand™ packets. The context information contains all the control, status and information necessary for all types of data transfer operations. The context memory interface 716 also provides an interface to host software and presents different types of memory mapped register sets which specify channel configurations and to initiate channel operations. For example, the memory mapped register sets may include global HCA context registers which affect the operation of Send Queue (SQ) and Work Queue (WQ), work queue pair (WQP) registers which control the establishment of channels, and completion queue (CQ) registers which specify the location and length of a completion queue (CQ) in host memory 206 and control whether interrupts are generated when completion queue (CQ) entries are written.

The local bus interface 718 provides an interface to a local data bus responsible for supporting system accessible context connections and channel operations, and for turning the signal data into appropriate forms for the Micro-Engine (ME) 710, including MicroCode loading.

The completion queue/doorbell manager interface 720 provides an interface to completion queue (CQ) engine, and doorbell manager and memory registration rules of the VI architecture. Completion queue (CQ) engine (not shown) is responsible for posting global events and completion queue (CQ) entries. Doorbell manager (not shown) is responsible for keeping track of the number of outstanding work requests.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a Transmit FIFO and a serial interface 730.

The Receive FIFO interface 722A may be used by the Micro-Engine (ME) 710 to process incoming data packets, via the serial interface 730, including checking the header of each packet as shown in FIG. 3A for errors and checking if additional data needs to be read before passing the same to the host interface 712. The Transmit FIFO interface 722B may be used by the Micro-Engine (ME) 710 to build data packets for subsequent transmission, via the serial interface 730.

In addition, a Scheduler (not shown) may also be included for scheduling the next Virtual Interface (VI) to the context manager and supporting priority of traffic for data packets associated with Send Queue (SQ) and Receive Queue (RQ) of the work queue pair (WQP). Such a Scheduler may be provided to interface with the context memory interface 716, the local bus interface 718 and the completion queue/doorbell manager interface 720 for scheduled functions.

Figure 8:
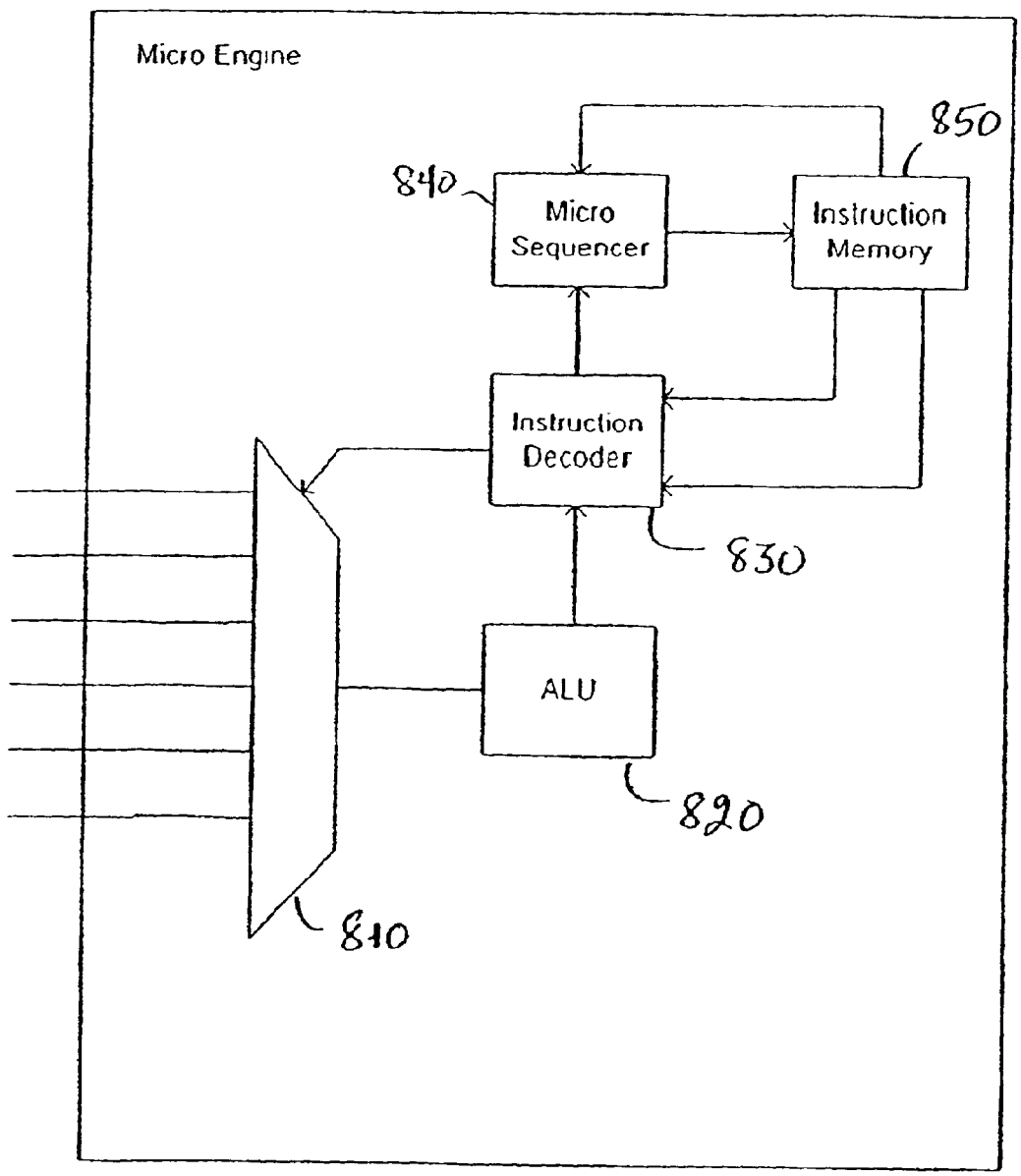
FIG. 8 illustrates an example Micro-Engine (ME) of a host-fabric adapter according to an embodiment of the present invention.

FIG. 8 illustrates an example Micro-Engine (ME) 710 configured to handle one of Send Queue and Receive Queue operations, including multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
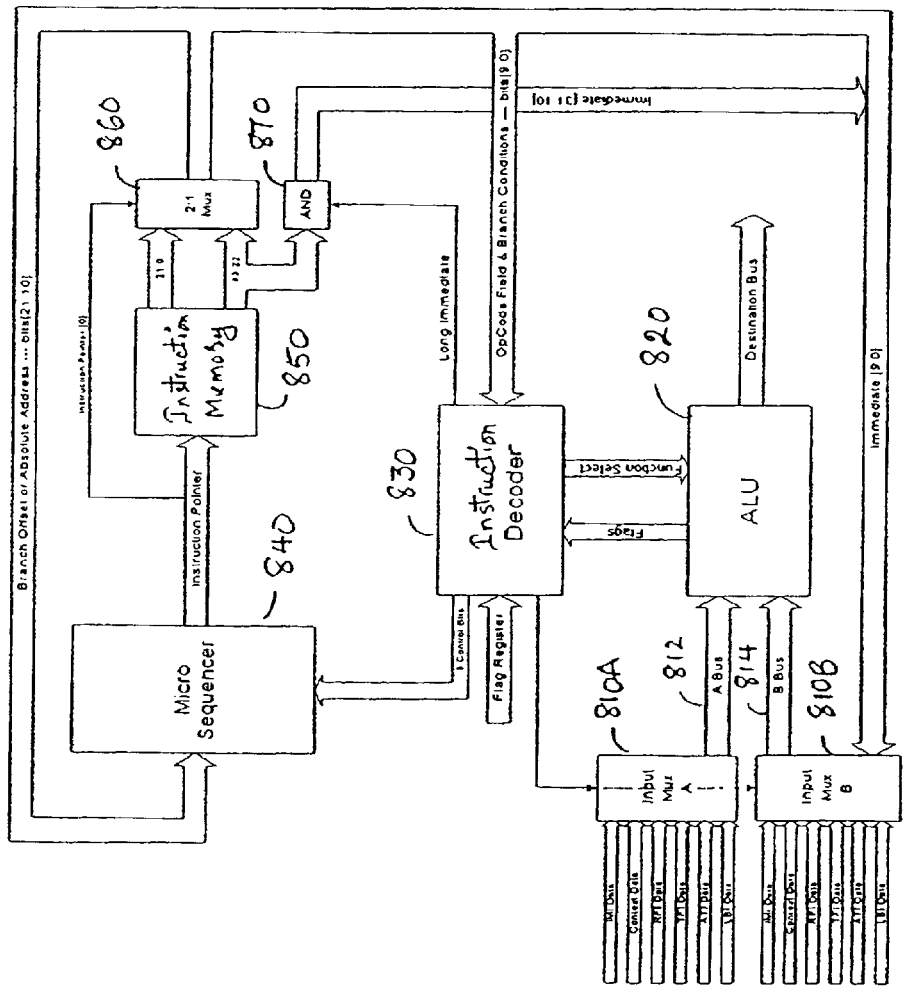
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 herein below:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory interface 716, the local bus interface 718, the completion queue/doorbell manager interface 720, and the first-in/first-out (FIFO) interface 722 needed to control ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. MicroCode may be downloadable into the SRAM for changes in future NGIO/InfiniBand™ specification enhancements. The SRAM may contain 2K×44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different code formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

Major challenges implementing a host-fabric adapter as shown in FIG. 7 are to maximize performance and resources of the Micro-Engine (ME) 710 in processing NGIO/InfiniBand™ packets and to optimize memory bandwidth while preserving the overall transfer rate. Specialized Hardware Assist (HWA) logic may be incorporated into one or more special purpose hardware interface blocks, such as the host interface 712, the address translation interface 714, the VI context memory interface 716, the local bus interface 718, the completion queue/doorbell manager interface 720, and the FIFO interface 722 so as to assist their respective interface functions and to help offloading the Micro-Engine (ME) 710 from hardware calculations in processing NGIO/InfiniBand™ packets. Context information which is stored in an internal context memory of the context memory interface 716 for sending and receiving NGIO/InfiniBand™ packets may need to be updated during ME cycles in such a way as to optimize memory bandwidth and preserve the overall data transfer rate. Typically such context information may be updated to provide all the control, status and information necessary for all types of data transfers. The context memory is always updated with latest values of context information, and the Micro-Engine (ME) 710 accesses to the latest values of that context information to do work (data movement operations such as message send/receive operations and RDMA read/write operations).

Figure 10:
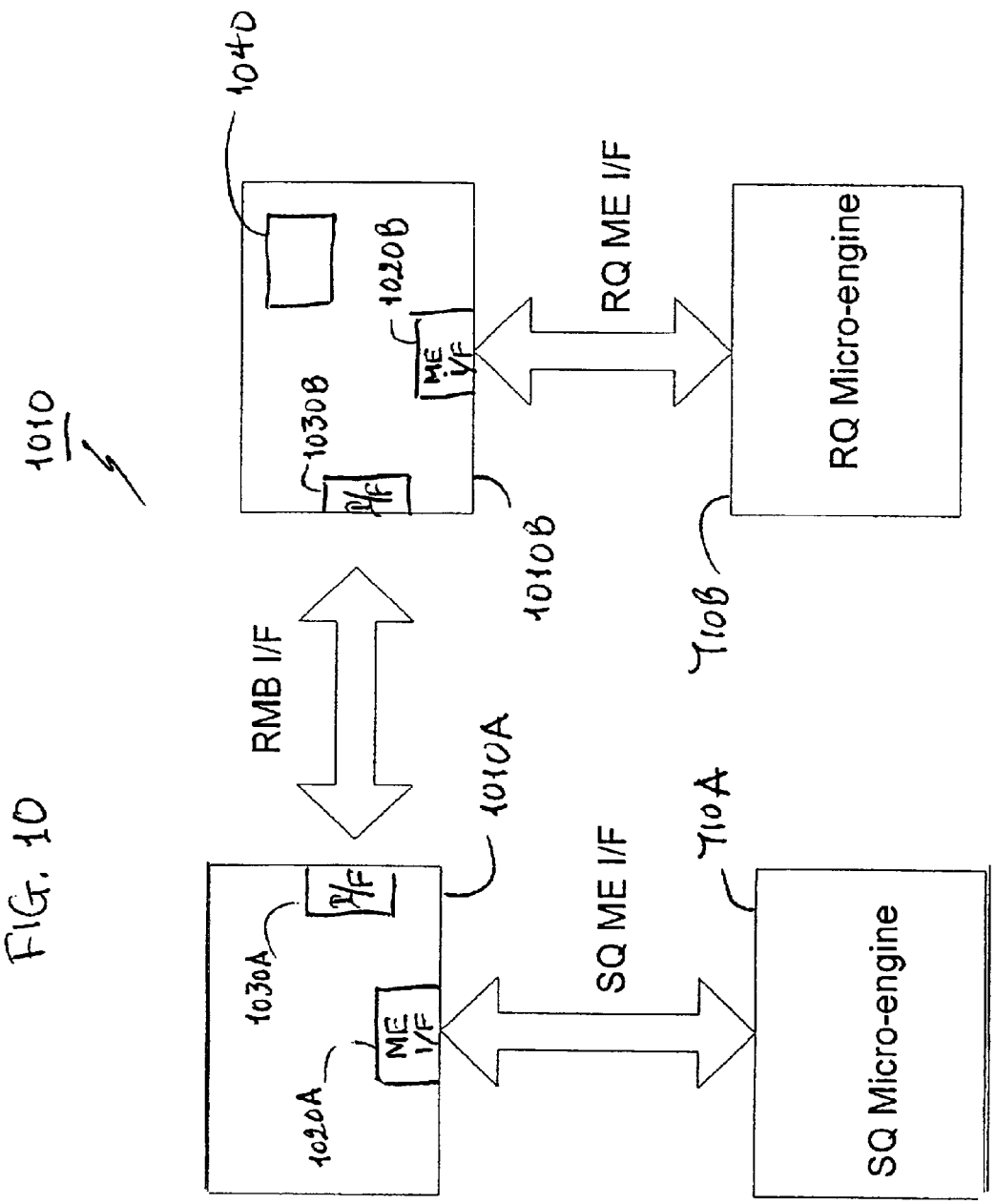
FIG. 10 illustrates an example Remote Key Manager Block (RMB) for checking the validity of remote keys which correspond to outstanding RDMA operations in host memory according to an embodiment of the present invention.

Turning now to FIG. 10, an example Remote Key Manager Block (RMB) for checking the validity of Remote Keys ("Rkeys") which correspond to outstanding RDMA operations in host memory 206 according to an embodiment of the present invention is illustrated. The Remote Keys ("Rkeys") typically come in request message data in a form of Descriptors ("WQE") as described with reference to FIGS. 3C–3D, and are used by the Micro-Engine (ME) 710 to identify the appropriate page for virtual to physical address translation from the address translation block (ATB) for outstanding RDMA read/write operations. Remote Keys (Rkeys) can be invalidated by using a Bind work request or descriptor ("WQE") posted on a Send Queue (SQ) of a work queue pair (WQP). Typical descriptors ("WQEs") as previously described are work requests posted for normal data transfer operations, such as normal sends, RDMA writes and RDMA reads. In contrast to normal Descriptors (WQE), Bind Descriptors are work requests posted for non data operations, such as, for example, moving or invalidating "Memory Windows" within particular memory regions of host memory 206 on a Send Queue (SQ) to restrict RDMA data transfers. A memory region is a normal block of host memory 206, typically no less than 4 Kbytes, (which corresponds to a memory page) that the host-fabric adapter 120 can access. In contrast to the memory region, a "Memory Window" specifies a smaller range of the memory region, for example, 5 Bytes. A Bind Descriptor ("WQE") allows the software to close (invalidate) the "Memory Window" completely so as to prevent work queue pair (WQP) access to that "Memory Window" or to move (enlarge or shrink) the "Memory Window" to a different memory region of host memory 206.

As shown in FIG. 10, the Remote Key Manager Block (RMB) 1010 may include separate RMB for Send Queue (SQ) 1010A and for Receive Queue (RQ) 1010B which correspond respectively to the Micro-Engine (ME) 710A for the Send Queue (SQ) of the work queue pair (WQP) and the Micro-Engine (ME) 710B for the Receive Queue (RQ) of the work queue pair (WQP).

The SQ RMB 1010A contains a Micro-Engine Interface ("ME-I/F") 1020A which provides an interface to the SQ Micro-Engine (ME) 710A, and a RMB Interface ("RMB-I/F") 1030A which provides an interface to the RQ RMB 1010B.

The RQ RMB 1010B contains a Micro-Engine Interface ("ME-I/F") 1020B which provides an interface to the RQ Micro-Engine (ME) 710B for allowing ME reads and writes; a RMB interface 1030B which provides an interface to the SQ RMB 1010A for accepting key invalidation requests from the SQ RMB 1010A and reporting back to the SQ RMB 1010A whether it is currently busy or idle; and a remote key memory 1040 which stores Remote Keys (Rkeys). Such a remote key Memory 1040 may correspond to a 1280×28 random-access-memory (RAM), and may be organized as follows:

| | | | |
|---|---|---|---|
| VI#0 or WQP# 0 | Parity | | Protection Domain(15:0) |
| | Parity | Valid | Remote Key 0(26:0) |
| | Parity | Valid | Remote Key 1(26:0) |
| | Parity | Valid | Remote Key 2(26:0) |
| | Parity | Valid | Remote Key 3(26:0) |
| VI#1 or WQP#1 Contents | | | |
| ... | | | |
| Max VI# or Max WQP# Contents | | | |

Protection Domain (PD) is information stored in the remote key Memory 1040 associated with Work Queues (WQs) including Completion Queues (CQs). The purpose of the Protection Domain (PD) is to limit that Work Queues (WQs) to only memory locations of a host memory 206 (see FIG. 6) registered to that Protection Domain (PD). Every Completion Queue (CQ) 620 has a Protection Domain (PD) assigned when created. The Protection Domain (PD) assigned to a Completion Queue (CQ) must match the Protection Domain (PD) returned by a translation entry of the Translation and Protection Table (TPT) in order for the Completion Queue (CQ) to access the new page of memory. If the Protection Domain (PD) does not match, then that page of memory is inaccessible and the Completion Queue (CQ) generates an error. Likewise, the Event Queue also uses Protection Domain (PD) for virtual to physical address translations.

The SQ Micro-Engine (ME) 710A may request a key invalidation through the following steps: (1) write to the Protection Domain "PD" Register (this will require PD comparison); (2) write the Remote Key Register (this will generate the request to the RQ RMB 1010B); (3) poll the busy bit from the RQ RMB 1010B to determine when the operation has completed.

The RQ Micro-Engine 710B can read and write the Remote Key (Rkey) at any given time since the ME accesses always have the highest priority, so reads and writes of the remote key Memory 1040 by the state machine are stalled during ME accesses.

The RQ Micro-Engine (ME) 710B may initialize the Protection Domain (PD) in the host memory 206. A PD of zero "0" indicates that the PD is invalid. The Rkeys correspond to the outstanding RDMA operations. The RQ Micro-Engine (ME) 710B sets valid bits on the Rkeys that it wants the SQ RMB 1010A to process.

The SQ Micro-Engine (ME) 710A provides the SQ RMB 1010A with the Protection Domain (PD) and the Rkey it wants to match. The SQ Micro-Engine (ME) 710A then kicks off the RMB operation by writing the SQ start bit in RMB registers. The SQ RMB 1010A starts walking through the remote key Memory 1040 starting from VI "0". The SQ RMB 1010A checks to see if the remote key Memory "PD" matches the SQ supplied "PD". If the remote key Memory "PD" does NOT MATCH the SQ supplied PD, the SQ RMB 1010A skips processing the Rkeys for that VI. If the remote key Memory "PD" MATCHES the SQ supplied PD, then the SQ RMB 1010A reads Remote Key "0" from the remote key Memory 1040. If the memory Remote Key "0" does NOT MATCH (either the Valid bit is NOT true OR the Valid bit is true and memory Remote Key "0" does not correspond to SQ Rkey (the SQ supplied key)), the SQ RMB 1010A moves to check the next Rkey. If the memory Remote Key "0" MATCHES the SQ supplied key (Valid bit is true AND Memory Remote Key 0=SQ Rkey), the SQ RMB 1010A clears the Valid bit corresponding to Rkey "0" in the remote key Memory 1040.

The remote key Memory 1040 may be a single read and single write port Memory. There can be RQ reads and writes to the remote key Memory 1040 at the same time as the SQ RMB 1010A is trying to walk through the remote key Memory 1040. So the SQ RMB 1010A holds off read memory accesses in those clock cycles when the Receive Queue (RQ) is trying to read the remote key Memory 1040 and holds off write accesses in those clock cycles when the Receive Queue (RQ) is trying to write to the remote key Memory 1040.

As soon as the SQ RMB 1010A walks through the whole key Memory 1040 to check all the Rkeys for all the VIs, a Done signal may be asserted to the Send Queue (SQ). The SQ RMB 1010A then waits to get kicked off by the Send Queue (SQ).

There may be one situation when care should be exercised i.e. when the reads and writes occur to the remote key Memory 1040 for the same address. In that situation, the read data is NOT valid. So when the read address is the same as write address and the remote key memory 1040 is being written to and read on the same clock cycle, the write data is directly passed to the read bus instead of the memory read data.

Figure 11:
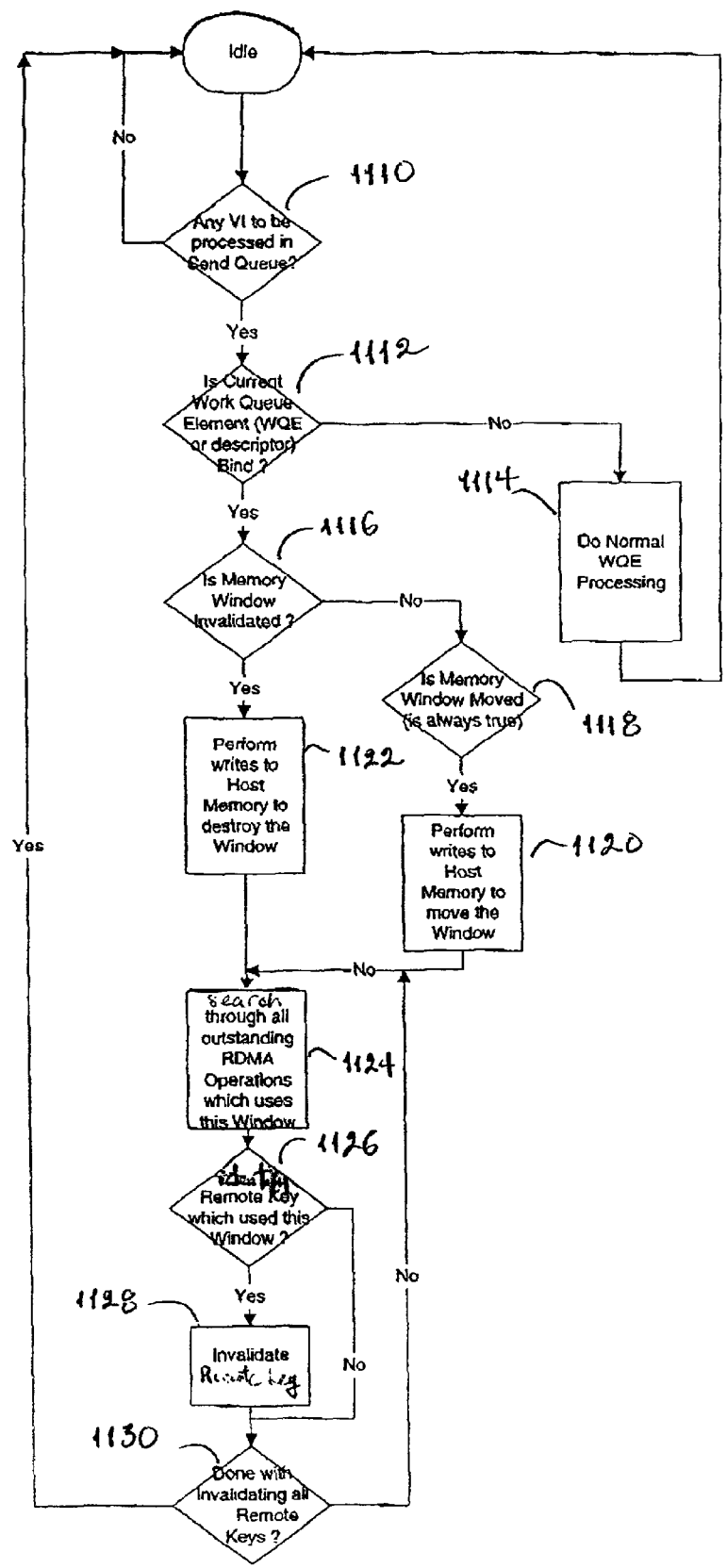
FIG. 11 illustrates an example high level remote key validation according to an embodiment of the present invention.

FIG. 11 illustrates an example high level remote key validation according to an embodiment of the present invention. The remote key validation may be activated by the Send Queue (SQ) of the work queue pair (WQP) in order to check the validity of Remote Keys (Rkeys) corresponding to outstanding RDMA operations in the remote key Memory 1040. Such Remote Keys (Rkeys), as previously described, are used with a Virtual Address to describe authorization for a remote system to access local memory 206 of a host system 130 as shown in FIGS. 4A–4B.

As shown in FIG. 11, the MicroCode of the Micro-Engine (ME) 710 determines if a work request in a form of a "descriptor" ("WQE") is posted at the Send Queue (SQ), that is if any VI is to be processed at the Send Queue (SQ) at block 1110. A descriptor (WQE) is typically posted for a normal data transfer operation, such as a normal send, a RDMA write and a RDMA read. If there is no work request posted or no VI to be processed at the Send Queue (SQ), the Micro-Engine (ME) 710 remains idle.

However, if there is work request posted or VI to be processed at the Send Queue (SQ), then the MicroCode determines if the descriptor posted is a Bind Descriptor at block 1112. A Bind Descriptor is a work request posted for a non data operation, such as, for example, moving or invalidating a "Memory Window" within memory regions of host memory 206 on a Send Queue (SQ) to restrict RDMA data transfers.

If the descriptor posted is not a Bind Descriptor, then the MicroCode enables processing for a normal data transfer operation, such as a normal Send, a RDMA-Write and a RDMA-Read, at block 1114. Typically, the entire microcontroller subsystem 700 as shown in FIG. 7 operates to process the normal data transfer operation, such as the normal Send, a RDMA-Write and a RDMA-Read. However, if the descriptor posted is a Bind Descriptor, then the MicroCode determines if the "Memory Window" is invalidated at block 1116.

If the "Memory Window" is NOT invalidated, then the MicroCode notes that the "Memory Window" is moved (always "TRUE") at block 1118, and proceeds to perform writes to host memory 206 to move the "Memory Window" at block 1120. However, if the "Memory Window" is invalidated, then the address translation block (ATB) (not shown) proceeds to perform writes to host memory 206 to destroy the "Memory Window" at block 1122.

After either condition, the RMB 1010 may then be activated to search through all outstanding RDMA operations which use the "Memory Window" at block 1124. Next, the RMB 1010 identifies a Remote Key (Rkey) which used this "Memory Window" at block 1126. If the Remote Key (Rkey) which used this "Memory Window" is identified, then the RMB 1010 proceeds to invalidate the Remote Key (Rkey) at block 1128 until all Remote Keys (Rkeys) are invalidated at block 1130. If no Remote Key (Rkey) is identified, then the RMB 1010 is done with invalidating all the Remote Keys (Rkeys) at block 1130 and returns to being idle. If all Remote Keys (Rkeys) are not invalidated, the RMB 1010 returns to block 1124 to search through all outstanding RDMA operations which uses the "Memory Window" until all Remote Keys (Rkeys) are marked "invalidated" so that no new Remote Keys (Rkeys) or new work queue pair (WQP) can come in and use that "Memory Window".

Figure 12:
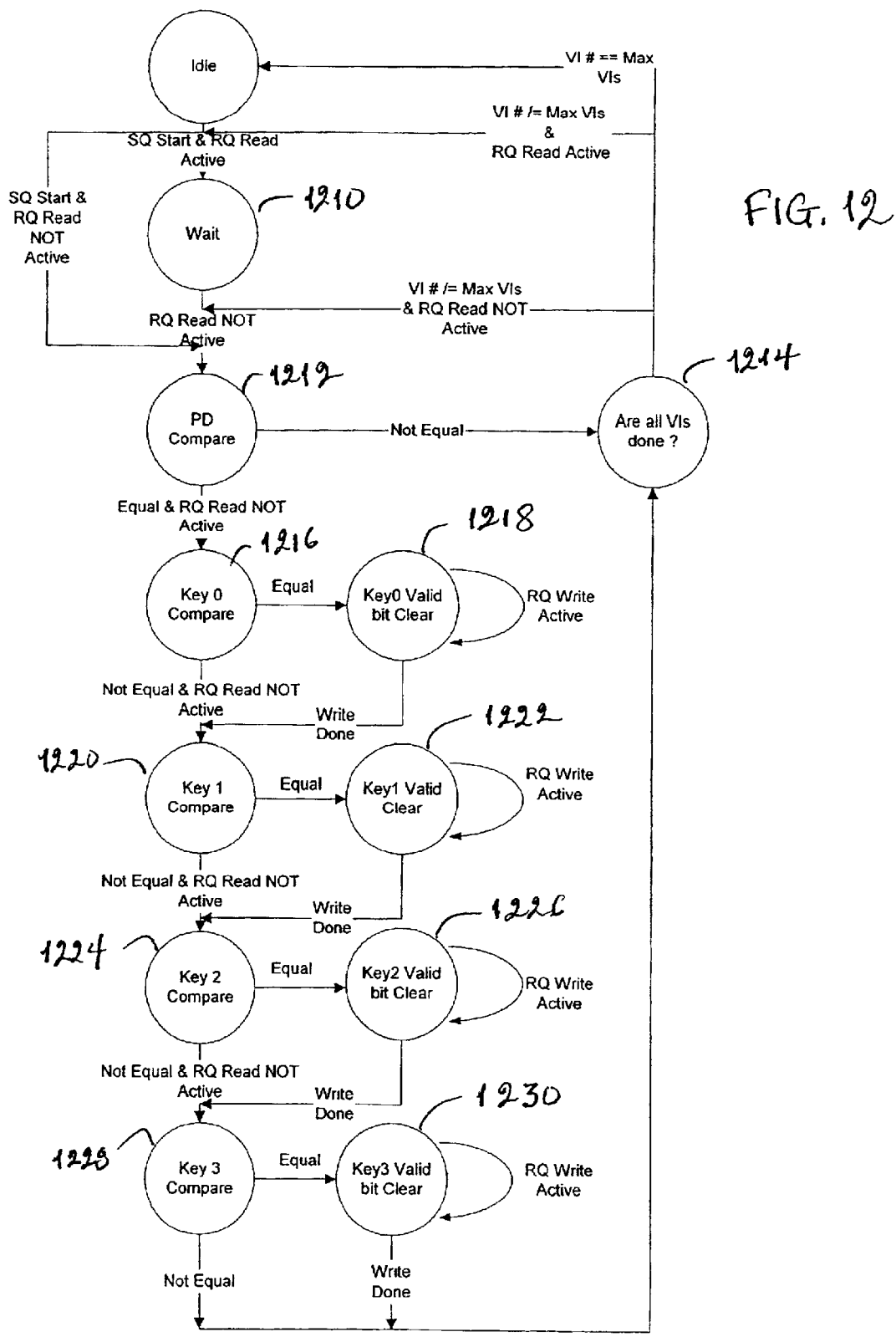
FIG. 12 illustrates an example individual key validation of the Remote Key Manager Block (RMB) according to an embodiment of the present invention.

FIG. 12 illustrates an example individual key validation shown by blocks 1124–1130, FIG. 11 as performed by the Remote Key Manager Block (RMB) 1010. According to the InfiniBand™ Architecture specification, there may be 256 "VIs" (also known as "WQPs" or "QPs"). All 256 VIs need to be processed individually for comparisons of Memory Rkeys (Remote Keys from the remote key memory 1040) and SQ Rkey (Remote Key from the Send Queue) for invalidation. However, the number of "VIs" is not limited thereto. Any number of "VIs" may suffice as long as such "VIs" are supported by the host-fabric adapter 120.

As shown in FIG. 12, the RMB 1010 remains idle until the SQ Micro-Engine (ME) 710A requests a key invalidation. In the interim, the RQ Micro-Engine (ME) 710B may be active and can read and write the Remote Key (Rkey) as it pleases. If there is a RQ read, the RMB 1010 waits for a predetermined time, for example, one clock cycle, at block 1210.

If there is no RQ read active or there is no longer any activity on the Receive Queue (RQ), the RMB 1010 initiates Protection Domain (PD) compare, that is, to compare the Memory PD (PD from the remote key memory 1040) and SQ supplied PD (PD from the Send Queue) at block 1212.

If the Memory PD does NOT MATCH the SQ supplied PD, the RMB 1010 skips processing the Rkeys for that VI, and proceeds to determine whether all VIs are done at block 1214. The reason is that, if the Memory PD does NOT MATCH the SQ supplied PD, then none of the Rkeys will match. As a result, the RMB 1010 may skip processing the Rkeys for that VI so as to save time and clock cycles.

However, if the Memory PD MATCHES the SQ supplied PD, the RMB 1010 knows that the work queue pair (WQP) is allowed to use the Rkeys. The RMB 1010 then proceeds to read and initiate Remote Key compares sequentially for all remote keys (Rkeys) associated with that particular VI as shown in blocks 1216–1230. There may be four (4) remote keys associated with each VI, including three (3) RDMA reads and one (1) RDMA write in progress at once in each work queue pair (WQP). However, the number of remote keys associated with each VI is not limited thereto. Since there are four (4) remote keys associated with each VI in this example implementation, the RMB 1010 must initiate four different Remote Key compares sequentially for key invalidation.

More specifically, the RMB 1010 reads and compares the Remote Key "0" from the remote key memory 1040 with the SQ supplied key at block 1216. If the memory Remote Key "0" does NOT MATCH (either the Valid bit is NOT true OR the Valid bit is true and memory Remote Key "0" does not correspond to SQ Rkey), the RMB 1010 moves to check the next Rkey. However, if the memory Remote Key "0" MATCHES the SQ supplied key (Valid bit is true AND Memory Remote Key 0=SQ Rkey), the RMB 1010 clears the Valid bit corresponding to Rkey "0" in the remote key Memory 1040 at block 1218.

Next, the RMB 1010 reads and compares the Remote Key "1" from the remote key memory 1040 with the SQ supplied key at block 1220. If the memory Remote Key "1" does NOT MATCH the SQ supplied key, the RMB 1010 moves to check the next Rkey. If the memory Remote Key "1" MATCHES the SQ supplied key, the RMB 1010 clears the Valid bit corresponding to Rkey "1" in the remote key Memory 1040 at block 1222.

Likewise, the RMB 1010 proceeds to read and compare the Remote Key "2" from the remote key Memory 1040 with the SQ supplied key at block 1224. If the memory Remote Key "2" does NOT MATCH the SQ supplied key, the RMB 1010 moves to check the next Rkey. If the memory Remote Key "2" MATCHES the SQ supplied key, the RMB 1010 clears the Valid bit corresponding to Rkey "2" in the remote key Memory 1040 at block 1226.

Finally, the RMB 1010 reads and compares the Remote Key "3" from the remote key Memory 1040 with the SQ supplied key at block 1228. If the memory Remote Key "3" does NOT MATCH the SQ supplied key, the RMB 1010 moves to determine whether all VIs are done at block 1214. If the memory Remote Key "3" MATCHES the SQ supplied key, the RMB 1010 clears the Valid bit corresponding to Rkey "3" in the remote key Memory 1040 at block 1230 and proceeds to determine whether all VIs are done at block 1214.

Figures 13A, 13B, 13C, 13D, 13E, 13F, 13G, 13H:
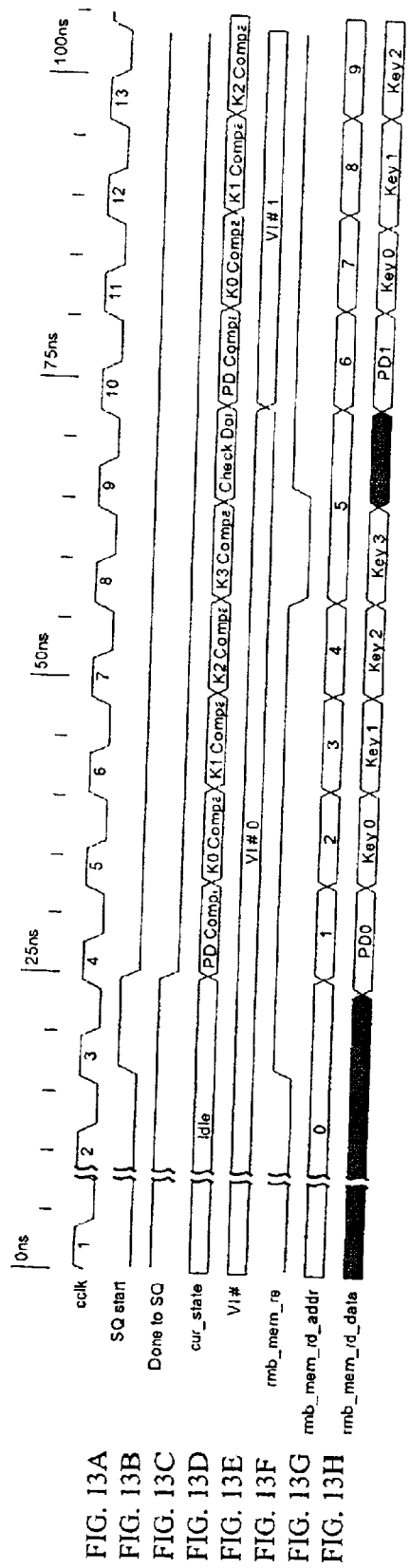
FIGS. 13A, 13B, 13C, 13D, 13E, 13F, 13G, and 13H illustrate an example timing diagram of a normal Remote Key Manager Block (RMB) operation according to an embodiment of the present invention.

FIGS. 13A–13H illustrate an example timing diagram of a normal Remote Key Manager Block (RMB) operation according to an embodiment of the present invention. More specifically, FIG. 13A shows an example timing diagram of a clock cycle at every 8 ns, for example. FIG. 13B shows an example timing diagram of a SQ start from the Send Queue (SQ). FIG. 13C shows an example timing diagram of a corresponding completion to the Send Queue (SQ). FIG. 13D shows an example timing diagram of a current state of the RMB 1010 according to an embodiment of the present invention. FIG. 13E shows an example timing diagram of a current "VI" or work queue pair (WQP) being processed. FIG. 13F shows an example timing diagram of a memory read (rmb__mem__re) of the RMB 1010 according to an embodiment of the present invention. FIG. 13G shows an example timing diagram of a memory read address (rmb__mem__rd__addr) of the RMB 1010 according to an embodiment of the present invention. FIG. 13H shows an example timing diagram of memory read data (rmb__mem__rd__data) according to an embodiment of the present invention.

In this case, RMB processing of all the Rkeys for a single "VI" (also known as "WQP" or "WP") and transition to the next VI is discussed. The Memory PD is assumed to match the SQ supplied PD. The Memory Rkeys is assumed to NOT match the SQ supplied Rkeys.

A cycle by cycle explanation of this operation may be discussed below:

As shown in FIGS. 13A–13H, the RMB 1010 remains idle during cycle #1 and cycle #2. At cycle #3, when the Send Queue (SQ) kicks of the RMB operation as shown in FIG. 13B, the RMB 1010 asserts a Read Enable to the remote key Memory 1040 shown in FIG. 13F, and drives the correct address to read the Protection Domain (PD) for the first VI, that is, VI "0" as shown in FIG. 13G.

At cycle #4, the Memory PD is compared to the SQ supplied PD. Since there is a MATCH, the RMB 1010 starts reading the Remote Keys (Rkeys) corresponding to that VI. A completion indication (Done signal) to the Send Queue (SQ) is then de-asserted as shown in FIG. 13C.

At cycles #5, #6 and #7, if the Rkeys "0", "1" and "2" from the remote key Memory 1040 do NOT match the SQ supplied Rkey, the RMB 1010 continues reading the remote key Memory 1040.

At cycle #8, if the Rkey "3" read from the remote key Memory 1040 does NOT MATCH the SQ supplied Rkey, the current VI Rkey processing is completed. The Read Enable to the remote key Memory 104 is de-asserted by the RMB 1010 as shown in FIG. 13F.

At cycle #9, the RMB 1010 checks to see if all the VI's are done (see block 1214, FIG. 12). If all the VI's are not done, and Receive Queue (RQ) is NOT accessing the remote key Memory 1040, the RMB 1010 starts reading the Protection Domain (PD) for the next VI, that is VI "1".

At cycle #10, the Memory PD is again compared to the SQ supplied PD in the same manner described with reference to cycle #4. However, the VI# is incremented.

At cycles #11, #12 and #13, if the Rkeys "0", "1" and "2" from the remote key Memory 1040 do NOT match the SQ supplied Rkey in the same manner described with reference to cycles #5, #6 and #7, the RMB 1010 continues reading the remote key Memory 1040.

Figures 14A, 14B, 14C, 14D, 14E, 14F, 14G, 14H:
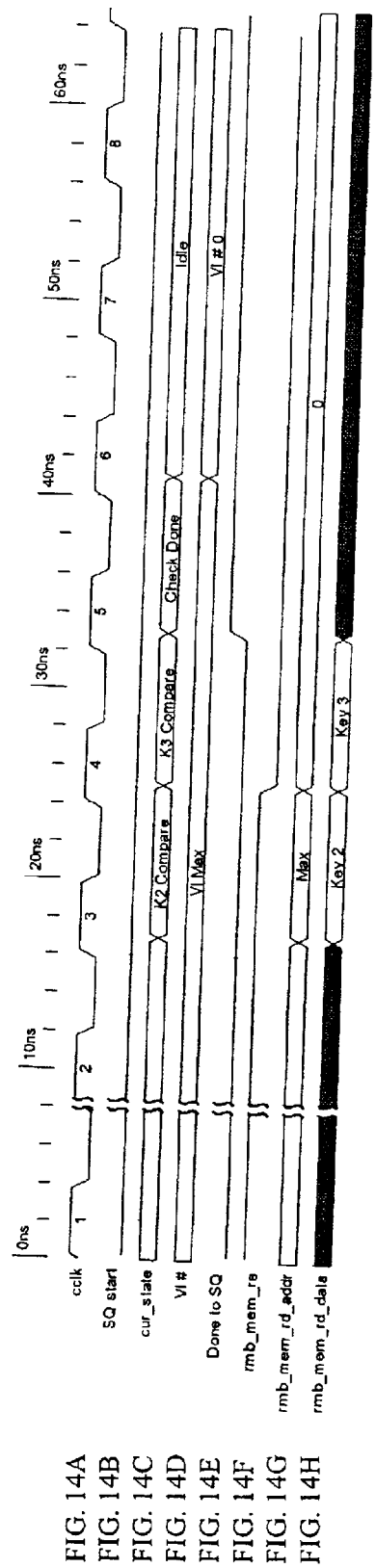
FIGS. 14A, 14B, 14C, 14D, 14E, 14F, 14G, and 14H illustrate an example timing diagram of completion of a normal Remote Key Manager Block (RMB) operation according to an embodiment of the present invention.

FIGS. 14A–14H illustrate an example timing diagram of completion of a normal Remote Key Manager Block (RMB) operation according to an embodiment of the present invention. For example, FIG. 14A shows an example timing diagram of a clock cycle at every 8 ns. FIG. 14B shows an example timing diagram of a SQ start from the Send Queue (SQ). FIG. 14C shows an example timing diagram of a corresponding completion to the Send Queue (SQ). FIG. 14D shows an example timing diagram of a current state of the RMB 1010 according to an embodiment of the present invention. FIG. 14E shows an example timing diagram of a current "VI" or work queue pair (WQP) being processed.

FIG. 14F shows an example timing diagram of a memory read (rmb_mem_re) of the RMB 1010 according to an embodiment of the present invention. FIG. 14G shows an example timing diagram of a memory read address (rmb_mem_rd_addr) of the RMB 1010 according to an embodiment of the present invention. FIG. 14H shows an example timing diagram of memory read data (rmb_mem_rd_data) according to an embodiment of the present invention.

In this case, RMB processing of the last two keys for the last VI and transition to the idle state is discussed. The Memory Rkeys is assumed to NOT match the SQ supplied Rkeys.

A cycle by cycle explanation of this operation may be discussed below:

As shown in FIGS. 14A–14H, the RMB 1010 remains in the middle of processing VI Max during cycle #1 and cycle #2. At cycle #3 and cycle #4, the RMB 1010 determines that the Rkey "2" and Rkey "3" read sequentially from the remote key Memory 1040 do NOT MATCH the SQ supplied Rkey for VI Max as shown in FIG. 14H.

At cycle #5, the RMB 1010 checks to see if all the VI's are done (see block 1214, FIG. 12). If all the VI's are done, the RMB 1010 transitions to being idle in the next clock cycle as shown in FIG. 14C. The RMB 1010 also asserts a completion indication (Done signal) to the Send Queue (SQ) as shown in FIG. 14E.

At cycle #6, the VI # rolls over to zero "0" to get ready for next kickoff of the RMB 1010 as shown in FIG. 14D. At cycles #7 and #8, the RMB 1010 then remains idle as shown in FIG. 14C.

Figures 15A, 15B, 15C, 15D, 15E, 15F, 15G, 15H:
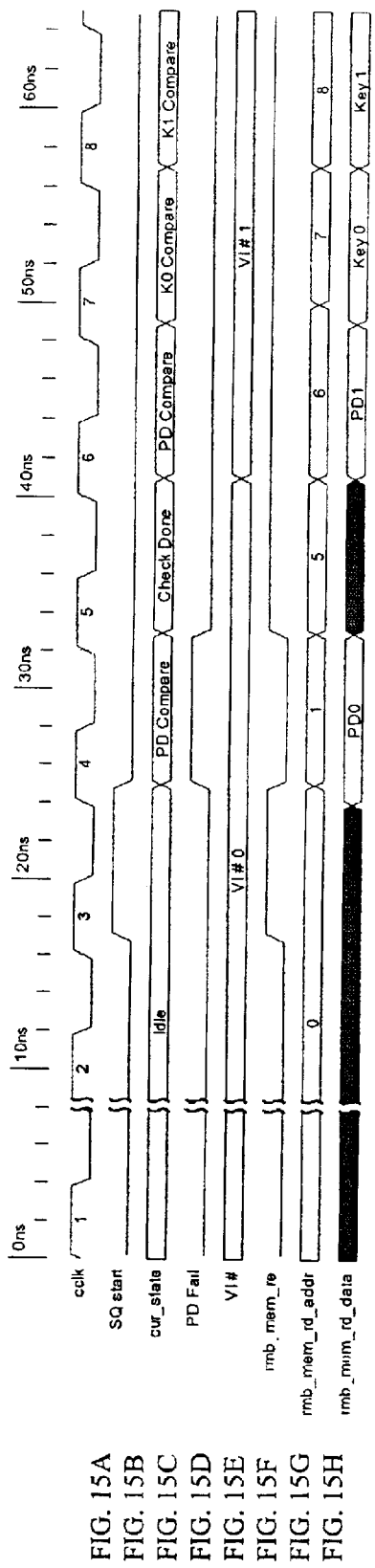
FIGS. 15A, 15B, 15C, 15D, 15E, 15F, 15G, and 15H illustrate an example timing diagram of a Remote Key Manager Block (RMB) operation where there is a Protection Domain (PD) mismatch according to an embodiment of the present invention.

FIGS. 15A–15H illustrate an example timing diagram of a Remote Key Manager Block (RMB) operation where there is a Protection Domain (PD) mismatch according to an embodiment of the present invention. In this case, the RMB 1010 starts processing a VI. The Memory PD is assumed to NOT match the SQ supplied PD. So the RMB 1010 skips processing the Rkeys for the current VI and transitions to the next VI. FIG. 15A shows an example timing diagram of a clock cycle at every 8 ns, for example. FIG. 15B shows an example timing diagram of a SQ start from the Send Queue (SQ). FIG. 15C shows an example timing diagram of a current state of the RMB 1040 according to an embodiment of the present invention. FIG. 15D shows an example timing diagram of a PD Fail indication from the RMB 1010. FIG. 15E shows an example timing diagram of a current "VI" or work queue pair (WQP) being processed. FIG. 15F shows an example timing diagram of a memory read (rmb_mem_re) of the RMB 1010 according to an embodiment of the present invention. FIG. 15G shows an example timing diagram of a memory read address (rmb_mem_rd_addr) of the RMB 1010 according to an embodiment of the present invention. FIG. 15H shows an example timing diagram of memory read data (rmb_mem_rd_data) according to an embodiment of the present invention.

A cycle by cycle explanation of this operation may be discussed below:

As shown in FIGS. 15A–15H, the RMB 1010 remains idle during cycle #1 and cycle #2. At cycle #3, when the Send Queue (SQ) kicks of the RMB operation as shown in FIG. 15B, the RMB 1010 asserts a Read Enable to the remote key Memory 1040 and drives the correct address to read the Protection Domain (PD) for the first VI, that is, VI "0".

At cycle #4, the Memory PD is compared to the SQ supplied PD as shown in FIG. 15C. Since there is a MISMATCH, the Rkey processing for the current VI has to be terminated. Therefore, the RMB 1010 stops reading the Remote Keys (Rkeys) corresponding to that VI. The read address is loaded with the PD address of the next VI as shown in FIG. 15G.

At cycle #5, the RMB 1010 checks to see if all the VI's are done (see block 1214, FIG. 12). If all the VI's are not done, and Receive Queue (RQ) is NOT accessing the remote key Memory 1040, the RMB 1010 starts reading the Protection Domain (PD) for the next VI, that is VI "1".

At cycle #6, the VI# is incremented as shown in FIG. 15E. The Memory PD is compared to the SQ supplied PD as shown in FIG. 15C. Since there is a MATCH, the RMB 1010 starts reading the Remote Keys (Rkeys) corresponding to that VI.

At cycles #7 and #8, if the Rkeys "0" and "1" from the remote key Memory 1040 do NOT MATCH the SQ supplied Rkey, the RMB 1010 continues reading the remote key Memory 1040.

Figures 16A, 16B, 16C, 16D, 16E, 16F, 16G, 16H, 16I, 16J, 16K:
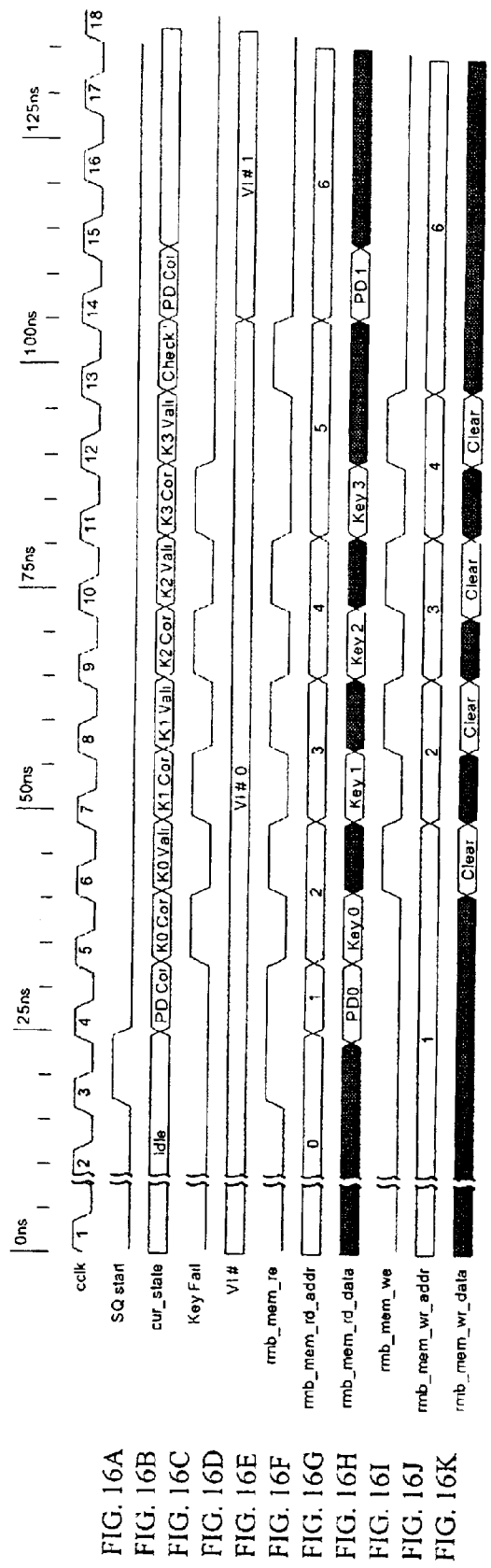
FIGS. 16A, 16B, 16C, 16D, 16E, 16F, 16G, 16H, 16I, 16J, and 16K illustrate an example timing diagram of a Remote Key Manager Block (RMB) operation where there are multiple key mismatches according to an embodiment of the present invention.

FIGS. 16A–16K illustrate an example timing diagram of a Remote Key Manager Block (RMB) operation where there are multiple key mismatches according to an embodiment of the present invention. In this case, the RMB 1010 starts processing a VI. The Memory PD is assumed to MATCH the SQ supplied PD. All the Memory Rkeys is assumed to MATCH the SQ supplied Rkeys. So the RMB 1010 has to Clear the Valid bit for each and every Rkey. The transition to the next VI is also shown. More specifically, FIG. 16A shows an example timing diagram of a clock cycle at every 8 ns, for example. FIG. 16B shows an example timing diagram of a SQ start from the Send Queue (SQ). FIG. 16C shows an example timing diagram of a current state of the RMB 1040 according to an embodiment of the present invention. FIG. 16D shows an example timing diagram of a PD Fail indication from the RMB 1010. FIG. 16E shows an example timing diagram of a current "VI" or work queue pair (WQP) being processed. FIG. 16F shows an example timing diagram of a memory read (rmb_mem_re) of the RMB 1010 according to an embodiment of the present invention. FIG. 16G shows an example timing diagram of a memory read address (rmb_mem_rd_addr) of the RMB 1010 according to an embodiment of the present invention. FIG. 16H shows an example timing diagram of memory read data (rmb_mem_rd_data) according to an embodiment of the present invention. FIG. 16I shows an example timing diagram of a memory write (rmb_mem_we) of the RMB 1010 according to an embodiment of the present invention. FIG. 16J shows an example timing diagram of a memory write address (rmb_mem_wr_addr) of the RMB 1010 according to an embodiment of the present invention. FIG. 16K shows an example timing diagram of memory write data (rmb_mem_wr_data) according to an embodiment of the present invention.

A cycle by cycle explanation of this operation may be discussed below:

As shown in FIGS. 16A–16K, the RMB 1010 remains idle during cycle #1 and cycle #2. At cycle #3, when the Send Queue (SQ) kicks of the RMB operation as shown in FIG. 16B, the RMB 1010 asserts a Read Enable to the remote key Memory 1040 as shown in FIG. 16F, and drives the correct address to read the Protection Domain (PD) for the first VI, that is, VI "0" as shown in FIG. 16G.

At cycle #4, the Memory PD is compared to the SQ supplied PD. Since there is a MATCH, the RMB 1010 starts reading the Remote Keys (Rkeys) corresponding to that VI.

At cycle #5, the RKey "0" from the remote key Memory 1040 MATCHES the SQ supplied Rkey. As a result, the RMB 1010 stops reading the remote key Memory 1040.

At cycle #6, the Valid bit corresponding to Rkey "0" has to be cleared in the remote key Memory 1040. Therefore, the RMB 1010 asserts the Write Enable to the remote key Memory 1040 as shown in FIG. 16I. In addition, the RMB 1010 starts reading Rkey "1".

At cycle #7, the Rkey "1" from the remote key Memory 1040 MATCHES the SQ supplied Rkey. As a result, the RMB 1010 stops reading the remote key Memory 1040.

At cycle #8, the Valid bit corresponding to Rkey "1" has to be cleared in the remote key Memory 1040. Therefore, the RMB 1010 asserts the Write Enable to the remote key Memory 1040 as shown in FIG. 16I. The RMB 1010 also starts reading Rkey "2".

At cycle #9, the Rkey "2" from the remote key Memory 1040 MATCHES the SQ supplied Rkey. As a result, the RMB 1010 stops reading the remote key Memory 1040.

At cycle #10, the Valid bit corresponding to Rkey "2" has to be cleared in the remote key Memory 1040. Therefore, the RMB 1010 asserts the Write Enable to the remote key Memory 1040 as shown in FIG. 16I. The RMB 1010 also starts reading Rkey "3".

At cycle #11, the RKey "3" from the remote key Memory 1040 MATCHES the SQ supplied Rkey. As a result, the RMB 1010 stops reading the remote key Memory 1040.

At cycle #12, the Valid bit corresponding to Rkey "3" has to be cleared in the remote key Memory 1040. Therefore, the RMB 1010 asserts the Write Enable to the remote key Memory 1040 as shown in FIG. 16I.

At cycle #13, the RMB 1010 checks to see if all the VI's are done (see block 1214, FIG. 12). If all the VI's are not done, and Receive Queue (RQ) is NOT accessing the remote key Memory 1040, the RMB 1010 starts reading the Protection Domain (PD) for the next VI, that is VI "1".

At cycle #14, the Memory PD is again compared to the SQ supplied PD in the same manner described with reference to cycle #4. However, the VI# is incremented.

At cycle #15, the Rkey "0" from the remote key Memory 1040 MATCHES the SQ supplied Rkey as described with reference to cycle #5 but for a different VI.

FIGS. 17A–17M illustrate an example timing diagram of a Remote Key Manager Block (RMB) operation where there are multiple key mismatches with intermittent RQ memory accesses according to an embodiment of the present invention. In this case, the RMB 1010 starts processing a VI. The Memory PD is assumed to MATCH the SQ supplied PD. All the Memory Rkeys is assumed to MATCH the SQ supplied Rkeys. So the RMB 1010 had to Clear the Valid bit for each and every Rkey. But the RQ Micro-Engine (ME) 710B accesses the Memory 1040 on cycles on which the RMB 1010 is trying to access the Memory 1040, therefore the potential Memory access conflicts are discussed. The transition to the next VI is also shown.

More specifically, FIG. 17A shows an example timing diagram of a clock cycle at every 8 ns, for example. FIG. 17B shows an example timing diagram of a SQ start from the Send Queue (SQ). FIG. 17C shows an example timing diagram of a RQ source address from the Receive Queue (RQ). FIG. 17D shows an example timing diagram of a RQ memory write of the RMB 1010. FIG. 17E shows an example timing diagram of a current state of the RMB 1040 according to an embodiment of the present invention. FIG. 17F shows an example timing diagram of a Key Fail indication from the RMB 1010. FIG. 17G shows an example timing diagram of a current "VI" or work queue pair (WQP) being processed. FIG. 17H shows an example timing diagram of a memory read (rmb_mem_re) of the RMB 1010 according to an embodiment of the present invention. FIG. 17I shows an example timing diagram of a memory read address (rmb_mem_rd_addr) of the RMB 1010 according to an embodiment of the present invention. FIG. 17J shows an example timing diagram of memory read data (rmb_mem_rd_data) according to an embodiment of the present invention. FIG. 17K shows an example timing diagram of a memory write (rmb_mem_we) of the RMB 1010 according to an embodiment of the present invention. FIG. 17L shows an example timing diagram of a memory write address (rmb_mem_wr_addr) of the RMB 1010 according to an embodiment of the present invention. FIG. 17M shows an example timing diagram of memory write data (rmb_mem_wr_data) according to an embodiment of the present invention.

A cycle by cycle explanation of this operation may be discussed below:

As shown in FIGS. 17A–17M, the RMB 1010 remains idle during cycle #1 and cycle #2. At cycle #3, when the Send Queue (SQ) kicks of the RMB operation as shown in FIG. 17. So the RMB 1010 has to read the Protection Domain (PD) corresponding to VI "0" (also known as "WQP" or "QP"). However, the Receive Queue (RQ) is trying to read the remote key Memory 1040 on this clock. Therefore, the RMB 1010 waits until the Receive Queue (RQ) is NOT active.

At cycle #4, when the RQ is NOT active, the RMB 1010 asserts a Read Enable to the remote key Memory 1040, and drives the correct address to read the Protection Domain (PD) for the first VI, that is, VI "0" as shown in FIGS. 17I and 17J.

At cycle #5, the Memory PD is compared to the SQ supplied PD. Since there is a MATCH, the RMB 1010 has to start reading the Rkeys corresponding to that VI. But the Receive Queue (RQ) is trying to read the remote key Memory 1040 on this clock. So the RMB 1010 waits until the Receive Queue (RQ) is NOT active.

At cycle #6, the RMB 1010 starts reading the Rkey "0" form the remote key Memory 1040. At cycle #7, the Rkey "0" from the remote key Memory 1040 MATCHES the SQ supplied Rkey. As a result, the RMB 1010 stops reading the remote key Memory 1040.

At cycle #8, the Valid bit corresponding to Rkey "0" has to be cleared in the remote key Memory 1040. However, the Receive Queue (RQ) is writing to the remote key Memory 1040 on this clock. So the RMB 1010 waits until the Receive Queue (RQ) is NOT active.

At cycle #9, when the Receive Queue (RQ) is NOT active, the RMB 1010 clears the Valid bit corresponding to the Rkey "0" in the Memory 1040. Then the RMB 1010 starts reading Rkey "1".

At cycle #10, the Rkey "1" from the remote key Memory 1040 does NOT MATCH the SQ supplied Rkey. The RMB 1010 has to read Rkey "2" from the remote key Memory 1040. But the Receive Queue (RQ) is trying to read the remote key Memory 1040 on this clock. So the RMB 1010 waits until the Receive Queue (RQ) is NOT active.

At cycle #11, when the Receive Queue (RQ) is NOT active, the RMB 1010 starts reading Rkey "2" from the remote key Memory 1040.

At cycle #12, the Rkey "1" from the remote key Memory 1040 does NOT MATCH the SQ supplied Rkey. As a result, the RMB 1010 has to read Rkey "3" from the remote key Memory 1040. But the Receive Queue (RQ) is trying to read the remote key Memory 1040 on this clock. So the RMB 1010 waits until the Receive Queue (RQ) is NOT active.

At cycle #13, when the Receive Queue (RQ) is NOT active, the RMB 1010 starts reading Rkey "3" from the remote key Memory 1040.

At cycle #14, the Rkey "3" from the remote key Memory 1040 MATCHES the SQ supplied Rkey. As a result, the RMB 1010 stops reading from the remote key Memory 1040.

At cycle #15, the RMB 1010 wants to clear the Valid bit corresponding to Rkey "3" in the remote key Memory 1040. But the Receive Queue (RQ) is writing to the remote key Memory 1040 on this clock. So the RMB 1010 waits until the Receive Queue (RQ) is NOT active.

At cycle #16, when the Receive Queue (RQ) is NOT active, the RMB 1010 clears the Valid bit corresponding to Rkey "0" in the remote key Memory 1040.

At cycle #17, the RMB 1010 checks to see if all the VI's are done. If not all VI's are done, and the Receive Queue (RQ) is NOT accessing the Memory 1040, the RMB 1010 starts reading the PD for a next VI, that is VI#1 (also known as "WQP#1" or "QP#1").

At cycle #18, the RMB 1010 asserts the Read Enable to the Memory 1040 and drives the correct address to read the key "0" for the VI#1 in the same manner described with reference to cycle #4. But the VI# is incremented.

The timing diagrams shown in FIGS. 13A–13H, 14A–14H, 15A–15H, 16A–16K and 17A–17M are directed by the requirements of the ASIC process and other factors. If the ASIC process and the technology requirements (such as chip fabrication technology) are different, then the implementation of these steps shown in FIGS. 10–12 and the timing diagrams shown in FIGS. 13A–13H, 14A–14H, 15A–15H, 16A–16K and 17A–17M can be done differently. However the basic principle as described in the application may still be followed.

In addition, there may be two (2) other possible approaches that may have been utilized to implement the Remote Key Manager Block (RMB) in addition to those described with reference to FIGS. 10–12 of the application. Those possible approaches include implementing the Remote Key Manager Block (RMB) completely in hardware or completely in MicroCode. If the Remote Key Manager Block (RMB) had been implemented completely in hardware, a lot of race conditions would have been created because of the complex interaction between the SQ Bind Descriptors and the RQ RDMA operations, and the host memory Window Invalidation or Movement. Also, future modification or upgrade of the hardware would have been difficult, if not impossible, if there are future changes in the InfiniBand™ specification. If the Remote Key Manager Block (RMB) had been implemented completely in MicroCode, at least 9 clock cycles (5 reads and 4 writes) would have been required per WQP. For supporting 256 WQPs, a total of 256 (WQPs)*9(clocks/WQP)*8(ns/clock) ~18 us would have been required. This means that the host-fabric adapter would be completely stalled and NOT processing SQ data packets during this time. This would have created packet timeouts and other InfiniBand™ related conformance issues.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining. Micro-control subsystem of the host-fabric adapter is designed to control execution of NGIO/InfiniBand™ protocols with minimal pipelining. Also a key validation mechanism is implemented to manage and invalidate remote keys which correspond to outstanding data transactions (e.g., read/write operations) in such a data network so as to authorize remote systems to efficiently access host memory, via a channel-based switched fabric.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO), InfiniBand™ and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter, comprising:
   one or more Micro-Engines arranged to establish connections and support data transfer operations, via a switched fabric, in response to work requests from a host system for data transfer operations; and
   a remote key manager arranged to manage remote keys and check the validity of the remote keys which correspond to outstanding data transfer operations, via said switched fabric.

2. The host-fabric adapter as claimed in claim 1, further comprising a transport engine which contains a plurality of work queue pairs (WQPs) in which work requests in a form of descriptors are posted to describe data transfer operations and locations of data to be moved for processing and/or transportation via said switched fabric.

3. The host-fabric adapter as claimed in claim 2, wherein said work queue pairs (WQPs) each comprises:
   a Send Queue (SQ) utilized as an "initiator" which requests normal message sends to remote Virtual Interfaces (VIs) of a remote system, remote direct memory access (RDMA) reads which request messages to be read from specific memory locations of said remote system, via said switched fabric, and remote direct memory access (RDMA) writes which request messages to be written onto specific memory locations of said remote system, via said switched fabric; and
   a Receive Queue utilized as a "responder" which receives requests for messages from normal sends, RDMA reads and RDMA writes from said remote system, via said switched fabric.

4. The host-fabric adapter as claimed in claim 3, wherein said Micro-Engines comprise:
- a Send Queue (SQ) Micro-Engine arranged to control operations of the Send Queue (SQ) of the work queue pair (WQP); and
- a Receive Queue (RQ) Micro-Engine arranged to control operations of the Receive Queue (RQ) of the work queue pair (WQP).

5. The host-fabric adapter as claimed in claim 4, wherein said remote key manager contains a remote key memory for storing stores remote keys utilized for comparison with remote keys included in work requests for key validation.

6. The host-fabric adapter as claimed in claim 5, wherein said remote keys are used to identify an appropriate page for virtual to physical address translation for outstanding data transfer operations including RDMA read/write operations.

7. The host-fabric adapter as claimed in claim 6, wherein said work requests are posted in a form of descriptors for normal data transfer operations, such as normal sends, RDMA writes and RDMA reads, or in a form of Bind descriptors for non data operations, such as moving or invalidating "Memory Windows" within particular memory regions of a host memory of said host system on the Send Queue (SQ) to restrict RDMA data transfer operations.

8. The host-fabric adapter as claimed in claim 7, wherein said remote key manager is activated to check the validity of remote keys by:
- determining if a descriptor posted at the Send Queue (SQ) is a Bind descriptor for a non data operation;
- if the descriptor posted is not a Bind Descriptor, processing for a normal data transfer operation, such as a normal send, a RDMA write and a RDMA read;
- if the descriptor posted is a Bind Descriptor, determining if the "Memory Window" is invalidated;
- if the "Memory Window" is not invalidated, noting that the "Memory Window" is moved and performing writes to the host memory of said host system to move the "Memory Window";
- if the "Memory Window" is invalidated, performing writes to the host memory of said host system to destroy the "Memory Window";
- searching through all outstanding RDMA operations which use the "Memory Window" to identify a remote key which used the "Memory Window";
- if the remote key which used the "Memory Window" is identified, invalidating the remote key until all remote keys are invalidated;
- if no remote key is identified, completing invalidation of all the remote keys and returning to being idle; and
- if all remote keys are not invalidated, returning to search through all outstanding RDMA operations which uses the "Memory Window" until all remote keys are marked "invalidated" so that no new remote key or new work queue pair (WQP) can come in and use that "Memory Window".

9. The host-fabric adapter as claimed in claim 5, wherein said remote key Memory is a random-access-memory (RAM) having a single read port and a single write port.

10. The host-fabric adapter as claimed in claim 3, wherein said Micro-Engines and said remote key manager are configured to be compliant with the "*InfiniBand*™ *Specification*", and implemented as part of an Application Specific Integrated Circuit (ASIC).

11. A host-fabric adapter installed at a host system for connecting to a switched fabric of a data network, comprising:
- at least one Micro-Engine (ME) arranged to establish connections and support data transfers via said switched fabric;
- a serial interface arranged to receive and transmit data packets from said switched fabric for data transfer operations;
- a host interface arranged to receive and transmit work requests, in the form of descriptors, from said host system for data transfer operations;
- a context memory arranged to store context information needed for said Micro-Engine (ME) to process work requests for data transfer operations;
- a doorbell manager arranged to update the context information needed for said Micro-Engine (ME) to process work requests for data transfer operations; and
- a remote key manager arranged to manage remote keys and check the validity of the remote keys which correspond to outstanding data transfer operations.

12. The host-fabric adapter as claimed in claim 11, further comprising a transport engine which contains a plurality of work queue pairs (WQPs) in which work requests in a form of descriptors are posted to describe data transfer operations and locations of data to be moved for processing and/or transportation via said switched fabric.

13. The host-fabric adapter as claimed in claim 12, wherein said work queue pairs (WQPs) each comprises:
- a Send Queue (SQ) utilized as an "initiator" which requests normal message sends to remote Virtual Interfaces (VIs) of a remote system, remote direct memory access (RDMA) reads which request messages to be read from specific memory locations of said remote system, via said switched fabric, and remote direct memory access (RDMA) writes which request messages to be written onto specific memory locations of said remote system, via said switched fabric; and
- a Receive Queue utilized as a "responder" which receives requests for messages from normal sends, RDMA reads and RDMA writes from said remote system, via said switched fabric.

14. The host-fabric adapter as claimed in claim 13, wherein said Micro-Engine includes:
- a Send Queue (SQ) Micro-Engine arranged to control operations of the Send Queue (SQ) of the work queue pair (WQP); and
- a Receive Queue (RQ) Micro-Engine arranged to control operations of the Receive Queue (RQ) of the work queue pair (WQP).

15. The host-fabric adapter as claimed in claim 14, wherein said remote key manager contains a remote key memory for storing stores remote keys utilized for comparison with remote keys included in work requests for key validation.

16. The host-fabric adapter as claimed in claim 15, wherein said remote keys are used to identify an appropriate page for virtual to physical address translation for outstanding data transfer operations including RDMA read/write operations.

17. The host-fabric adapter as claimed in claim 16, wherein said work requests are posted in a form of descriptors for normal data transfer operations, such as normal sends, RDMA writes and RDMA reads, or in a form of Bind descriptors for non data operations, such as moving or invalidating "Memory Windows" within particular memory regions of a host memory of said host system on the Send Queue (SQ) to restrict RDMA data transfer operations.

18. The host-fabric adapter as claimed in claim 17, wherein said remote key manager is activated to check the validity of remote keys by:
   determining if a descriptor posted at the Send Queue (SQ) is a Bind descriptor for a non data operation;
   if the descriptor posted is not a Bind Descriptor, processing for a normal data transfer operation, such as a normal send, a RDMA write and a RDMA read;
   if the descriptor posted is a Bind Descriptor, determining if the "Memory Window" is invalidated;
   if the "Memory Window" is not invalidated, noting that the "Memory Window" is moved and performing writes to the host memory of said host system to move the "Memory Window";
   if the "Memory Window" is invalidated, performing writes to the host memory of said host system to destroy the "Memory Window";
   searching through all outstanding RDMA operations which use the "Memory Window" to identify a remote key which used the "Memory Window";
   if the remote key which used the "Memory Window" is identified, invalidating the remote key until all remote keys are invalidated;
   if no remote key is identified, completing invalidation of all the remote keys and returning to being idle; and
   if all remote keys are not invalidated, returning to search through all outstanding RDMA operations which uses the "Memory Window" until all remote keys are marked "invalidated" so that no new remote key or new work queue pair (WQP) can come in and use that "Memory Window".

19. The host-fabric adapter as claimed in claim 18, wherein said remote key manager is activated upon a request for key invalidation from said SQ Micro-Engine to invalidate remote keys by:
   initiating a Protection Domain (PD) compare between the Memory PD and SQ supplied PD of a Virtual Interface (VI);
   if the Memory PD does not match the SQ supplied PD, skipping processing the remote keys for that VI, and determining whether all VIs are done; and
   if the Memory PD matches the SQ supplied PD, reading and initiating remote key compares sequentially for all remote keys associated with that VI for key invalidation.

20. The host-fabric adapter as claimed in claim 19, wherein said remote key manager initiates remote key compares for all remote keys associated with that VI by:
   reading and comparing a first remote key from the remote key Memory with the SQ supplied key;
   if the first remote key does not match the SQ supplied key, moving to check a next remote key;
   if the first remote key matches the SQ supplied key, clearing a Valid bit corresponding to the first remote key in the remote key Memory;
   reading and comparing a second remote key from the remote key Memory with the SQ supplied key;
   if the second remote key does not match the SQ supplied key, moving to check the next remote key;
   if the second remote key matches the SQ supplied key, clearing the Valid bit corresponding to the second remote key in the remote key Memory;
   reading and comparing a third remote key from the remote key Memory with the SQ supplied key;
   if the third memory remote key does not match the SQ supplied key, moving to check a next remote key;
   if the third remote key matches the SQ supplied key, clearing the Valid bit corresponding to third remote key in the remote key Memory;
   reading and comparing a last remote key from the remote key Memory with the SQ supplied key;
   if the last memory remote key does not match the SQ supplied key, moving to determine whether all VIs are done; and
   if the last remote key matches the SQ supplied key, clearing the Valid bit corresponding to the last remote key in the remote key Memory and determining whether all VIs are done.

21. The host-fabric adapter as claimed in claim 15, wherein said remote key Memory is a 1280×28 random-access-memory (RAM) having a single read port and a single write port.

22. The host-fabric adapter as claimed in claim 11, wherein said Micro-Engine, said host interface, said serial interface, said context memory, said doorbell manager, and said remote key manager are configured to be compliant with the "InfiniBand™ Specification", and implemented as part of an Application Specific Integrated Circuit (ASIC).

23. A method for connecting a host-fabric adapter installed at a host system to a switched fabric of a data network, the method comprising:
   establishing connections and supporting data transfers via said switched fabric;
   receiving and transmitting data packets from said switched fabric for data transfer operations;
   receiving and transmitting work requests, in the form of descriptors, from said host system for data transfer operations;
   storing context information needed to process work requests for data transfer operations;
   updating the context information needed to process work requests for data transfer operations; and
   managing remote keys and checking the validity of the remote keys which correspond to outstanding data transfer operations.

24. The method as claimed in claim 23, further comprising checking a validity of remote keys by:
   determining if a descriptor posted at a Send Queue (SQ) is a Bind descriptor for a non data operation;
   if the descriptor posted is not a Bind Descriptor, processing for a normal data transfer operation, such as a normal send, a RDMA write and a RDMA read;
   if the descriptor posted is a Bind Descriptor, determining if a "Memory Window" is invalidated;
   if the "Memory Window" is not invalidated, noting that the "Memory Window" is moved and performing writes to the host memory of said host system to move the "Memory Window";
   if the "Memory Window" is invalidated, performing writes to the host memory of said host system to destroy the "Memory Window";
   searching through all outstanding operations which use the "Memory Window" to identify a remote key which used the "Memory Window";
   if the remote key which used the "Memory Window" is identified, invalidating the remote key until all remote keys are invalidated;

if no remote key is identified, completing invalidation of all the remote keys and returning to being idle; and if all remote keys are not invalidated, returning to search through all outstanding operations which use the "Memory Window" until all remote keys are marked "invalidated" so that no new remote key or new work queue pair can come in and use that "Memory Window".

25. The method as claimed in claim 24, further comprising activating the remote key manager upon a request for key invalidation to invalidate remote keys by:

initiating a Protection Domain (PD) compare between the Memory PD and SQ supplied PD of a Virtual Interface (VI);

if the Memory PD does not match the SQ supplied PD, skipping processing the remote keys for that VI, and determining whether all VIs are done; and if the Memory PD matches the SQ supplied PD, reading and initiating remote key compares sequentially for all remote keys associated with that VI for key invalidation.

26. The method as claimed in claim 25, wherein said remote key manager initiates remote key compares for all remote keys associated with that VI by:

reading and comparing a first remote key from the remote key Memory with the SQ supplied key;

if the first remote key does not match the SQ supplied key, moving to check a next remote key;

if the first remote key matches the SQ supplied key, clearing a Valid bit corresponding to the first remote key in the remote key Memory;

reading and comparing a second remote key from the remote key Memory with the SQ supplied key;

if the second remote key does not match the SQ supplied key, moving to check the next remote key;

if the second remote key matches the SQ supplied key, clearing the Valid bit corresponding to the second remote key in the remote key Memory;

reading and comparing a third remote key from the remote key Memory with the SQ supplied key;

if the third memory remote key does not match the SQ supplied key, moving to check a next remote key;

if the third remote key matches the SQ supplied key, clearing the Valid bit corresponding to third remote key in the remote key Memory;

reading and comparing a last remote key from the remote key Memory with the SQ supplied key;

if the last memory remote key does not match the SQ supplied key, moving to determine whether all VIs are done; and if the last remote key matches the SQ supplied key, clearing the Valid bit corresponding to the last remote key in the remote key Memory and determining whether all VIs are done.

27. The method as claimed in claim 23, further comprising posting work requests in a form of descriptors to describe data transfer operations and locations of data to be moved for processing and/or transportation via said switched fabric.

28. The method as claimed in claim 27, further comprising:

requesting normal message sends to remote Virtual Interfaces (VIs) of a remote system, requesting messages to be read from specific memory locations of said remote system, via said switched fabric, and requesting messages to be written onto specific memory locations of said remote system, via said switched fabric; and receiving requests for messages from normal sends, reads and writes from said remote system, via said switched fabric.

29. The method as claimed in claim 23, further comprising storing remote keys utilized for comparison with remote keys included in work requests for key validation.

30. The method as claimed in claim 29, further comprising identifying an appropriate page for virtual to physical address translation for outstanding data transfer operations.

31. The method as claimed in claim 23, wherein the method is compliant with the "InfiniBand™ Specification".

32. A method of checking the validity of remote keys which correspond to outstanding remote direct memory access (RDMA) operations in a host-fabric adapter installed at a host system, comprising:

determining if any Virtual Interface (VI) to be processed at a Send Queue (SQ) is a Bind descriptor for a non data operation;

if the descriptor posted is not a Bind Descriptor, processing for a normal data transfer operation;

if the descriptor posted is a Bind Descriptor, determining if the "Memory Window" is invalidated;

if the "Memory Window" is not invalidated, noting that the "Memory Window" is moved and performing writes to a host memory of said host system to move the "Memory Window";

if the "Memory Window" is invalidated, performing writes to the host memory of said host system to destroy the "Memory Window";

searching through all outstanding RDMA operations which use the "Memory Window" to identify a remote key which used the "Memory Window";

if the remote key which used the "Memory Window" is identified, invalidating the remote key until all remote keys are invalidated;

if no remote key is identified, completing invalidation of all the remote keys and returning to being idle; and if all remote keys are not invalidated, returning to search through all outstanding RDMA operations which uses the "Memory Window" until all remote keys are marked "invalidated" so that no new remote key or new work queue pair (WQP) can come in and use that "Memory Window".

33. The method as claimed in claim 32, wherein said remote keys are invalidated by:

initiating a Protection Domain (PD) compare between a Memory PD and SQ supplied PD of a Virtual Interface (VI);

if the Memory PD does not match the SQ supplied PD, skipping processing the remote keys for that VI, and determining whether all VIs are done; and if the Memory PD matches the SQ supplied PD, reading and initiating remote key compares sequentially for all remote keys associated with that VI for key invalidation.

34. The method as claimed in claim 33, wherein said remote key compares for all remote keys associated with that VI are performed by:

reading and comparing a first remote key from a remote key Memory with the SQ supplied key;

if the first remote key does not match the SQ supplied key, moving to check a next remote key;

if the first remote key matches the SQ supplied key, clearing a Valid bit corresponding to the first remote key in the remote key Memory;

reading and comparing a second remote key from the remote key Memory with the SQ supplied key;

if the second remote key does not match the SQ supplied key, moving to check the next remote key;

if the second remote key matches the SQ supplied key, clearing the Valid bit corresponding to the second remote key in the remote key Memory;

reading and comparing a third remote key from the remote key Memory with the SQ supplied key;

if the third memory remote key does not match the SQ supplied key, moving to check a next remote key;

if the third remote key matches the SQ supplied key, clearing the Valid bit corresponding to third remote key in the remote key Memory;

reading and comparing a last remote key from the remote key Memory with the SQ supplied key;

if the last memory remote key does not match the SQ supplied key, moving to determine whether all VIs are done; and if the last remote key matches the SQ supplied key, clearing the Valid bit corresponding to the last remote key in the remote key Memory and determining whether all VIs are done.

35. A host-fabric adapter, comprising:

one or more Micro-Engines arranged to establish connections and support data transfer operations, via a switched fabric, in response to work requests from a host system for data transfer operations; and a remote key manager arranged to manage remote keys and check the validity of the remote keys which correspond to outstanding data transfer operations, via said switched fabric;

wherein said work queue pairs (WQPs) each comprises:
  a Send Queue (SQ) utilized as an "initiator" which requests normal message sends to remote Virtual Interfaces (VIs) of a remote system, remote direct memory access (RDMA) reads which request messages to be read from specific memory locations of said remote system, via said switched fabric, and remote direct memory access (RDMA) writes which request messages to be written onto specific memory locations of said remote system, via said switched fabric; and
  a Receive Queue utilized as a "responder" which receives requests for messages from normal sends, RDMA reads and RDMA writes from said remote system, via said switched fabric;

wherein said Micro-Engines comprise:
  a Send Queue (SQ) Micro-Engine arranged to control operations of the Send Queue (SQ) of the work queue pair (WQP); and
  a Receive Queue (RQ) Micro-Engine arranged to control operations of the Receive Queue (RQ) of the work queue pairs (WQP);

wherein said remote key manager contains a remote key memo for storing stores remote keys utilized for comparison with remote keys included in work requests for key validation;

wherein said remote keys are used to identify an appropriate page for virtual to physical address translation for outstanding data transfer operations including RDMA read/write operations;

wherein said work requests are posted in a form of descriptors for normal data transfer operations, such as normal sends, RDMA writes and RDMA reads, or in a form of Bind descriptors for non data operations, such as moving or invalidating "Memory Windows" within particular memory regions of a host memory of said host system on the Send Queue (SQ) to restrict RDMA data transfer operations;

wherein said remote key manager is activated to check the validity of remote keys by:
  determining if a descriptor posted at the Send Queue (SQ) is a Bind descriptor for a non data operation;
  if the descriptor posted is not a Bind Descriptor, processing for a normal data transfer operation, such as a normal send, a RDMA write and a RDMA read;
  if the descriptor posted is a Bind Descriptor, determining if the "Memory Window" is invalidated;
  if the "Memory Window" is not invalidated, noting that the "Memory Window" is moved and performing writes to the host memory of said host system to move the "Memory Window";
  if the "Memory Window" is invalidated, performing writes to the host memory of said host system to destroy the "Memory Window";
  searching through all outstanding RDMA operations which use the "Memory Window" to identify a remote key which used the "Memory Window";
  if the remote key which used the "Memory Window" is identified, invalidating the remote key until all remote keys are invalidated;
  if no remote key is identified, completing invalidation of all the remote keys and returning to being idle; and
  if all remote keys are not invalidated, returning to search through all outstanding RDMA operations which uses the "Memory Window" until all remote keys are marked "invalidated" so that no new remote key or new work queue pair (WQP) can come in and use that "Memory Window";

wherein said remote key manager is activated upon a request for key invalidation from said SQ Micro-Engine to invalidate remote keys by:
  initiating a Protection Domain (PD) compare between the Memory PD and SQ supplied PD of a Virtual Interface (VI);
  if the Memory PD does not match the SQ supplied PD, skipping processing the remote keys for that VI, and determining whether all VIs are done; and
  if the Memory PD matches the SQ supplied PD, reading and initiating remote key compares sequentially for all remote keys associated with that VI for key invalidation.

36. The host-fabric adapter as claimed in claim 35, wherein said remote key manager initiates remote key compares for all remote keys associated with that VI by:
  reading and comparing a first remote key from the remote key Memory with the SQ supplied key;
  if the first remote key does not match the SQ supplied key, moving to check a next remote key;
  if the first remote key matches the SQ supplied key, clearing a Valid bit corresponding to the first remote key in the remote key Memory;
  reading and comparing a second remote key from the remote key Memory with the SQ supplied key;
  if the second remote key does not match the SQ supplied key, moving to check the next remote key;
  if the second remote key matches the SQ supplied key, clearing the Valid bit corresponding to the second remote key in the remote key Memory;

reading and comparing a third remote key from the remote key Memory with the SQ supplied key;

if the third memory remote key does not match the SQ supplied key, moving to check a next remote key;

if the third remote key matches the SQ supplied key, clearing the Valid bit corresponding to third remote key in the remote key Memory;

reading and comparing a last remote key from the remote key Memory with the SQ supplied key;

if the last memory remote key does not match the SQ supplied key, moving to determine whether all VIs are done; and if the last remote key matches the SQ supplied key, clearing the Valid bit corresponding to the last remote key in the remote key Memory and determining whether all VIs are done.

* * * * *